US012792209B1

(12) United States Patent
Labbe et al.

(10) Patent No.: US 12,792,209 B1
(45) Date of Patent: Nov. 10, 2026

(54) DYNAMIC CROSS-APPLICATION FUNCTIONALITY

(71) Applicant: Block, Inc., San Francisco, CA (US)

(72) Inventors: Brandon Labbe, San Francisco, CA (US); Benjamin Krogh, Portland, OR (US); Jason Sperling, San Rafael, CA (US); Harini Harika Sabbella, Fremont, CA (US)

(73) Assignee: Block, Inc., Oakland, CA (US)

( * ) Notice: Subject to any disclaimer, the term of this patent is extended or adjusted under 35 U.S.C. 154(b) by 170 days.

(21) Appl. No.: 17/974,091

(22) Filed: Oct. 26, 2022

Related U.S. Application Data

(60) Provisional application No. 63/336,833, filed on Apr. 29, 2022.

(51) Int. Cl.

| | |
|---|---|
| ***G06F 3/0489*** | (2022.01) |
| ***G06F 3/0482*** | (2013.01) |
| ***G06N 20/00*** | (2019.01) |
| ***G06Q 20/32*** | (2012.01) |
| *G06Q 20/12* | (2012.01) |

(52) U.S. Cl.
CPC .......... *G06F 3/0489* (2013.01); *G06F 3/0482* (2013.01); *G06N 20/00* (2019.01); *G06Q 20/326* (2020.05); *G06Q 20/12* (2013.01)

(58) Field of Classification Search
CPC ...... G06Q 20/12; G06Q 20/20; G06Q 20/326; G06Q 30/0613; G06F 40/174; G06F 3/0489; G06F 3/0482; G06N 20/00
See application file for complete search history.

(56) References Cited

U.S. PATENT DOCUMENTS 5,897,625 A * 4/1999 Gustin .................... G07F 19/20 379/93.12
7,742,947 B2 * 6/2010 Fu .......................... G06Q 30/04 705/34
8,468,457 B1 * 6/2013 Kay ...................... G06F 3/0489 715/744
8,655,733 B2 * 2/2014 Chen ...................... G06Q 20/40 705/17
8,756,516 B2 * 6/2014 Singh .................... G06F 3/0482 715/224
10,365,779 B2 * 7/2019 McCoy ................... G06F 3/017
11,010,211 B2 * 5/2021 Chen ....................... G06F 9/451
11,409,954 B2 * 8/2022 Leme .................... G06F 3/0484
11,553,075 B2 * 1/2023 Hwang ............. H04M 1/72451
2006/0090169 A1 * 4/2006 Daniels ................. G06F 3/0481 719/329
2014/0214641 A1 * 7/2014 Acker, Jr. .............. G06Q 40/00 705/35

(Continued)

*Primary Examiner* — Alvin H Tan
(74) *Attorney, Agent, or Firm* — Lee & Hayes, P.C.

(57) ABSTRACT

Techniques described herein are directed to, among other things, dynamic cross-application functionality between a payment processing application and ancillary applications residing on a merchant computing device. Shortcuts may be input in the ancillary applications, and when input, the payment processing application, or a version thereof, may be launched and selected data from the ancillary applications may be input into determined fields of the payment processing application without requiring additional user input to select the appropriate field.

20 Claims, 13 Drawing Sheets

(56) References Cited

U.S. PATENT DOCUMENTS

| | | | | |
|---|---|---|---|---|
| 2014/0337804 | A1 * | 11/2014 | Hwang .................. | G06V 30/36<br>715/863 |
| 2021/0149693 | A1 * | 5/2021 | Yang ...................... | G06Q 50/01 |
| 2022/0414328 | A1 * | 12/2022 | Nguyen ............... | G06V 30/414 |

* cited by examiner

DYNAMIC CROSS-APPLICATION FUNCTIONALITY

PRIORITY

This patent application claims priority to U.S. Provisional Patent Application No. 63/336,833, filed on Apr. 29, 2022, and entitled "DYNAMIC CROSS-APPLICATION FUNCTIONALITY", which is fully incorporated by reference herein in its entirety.

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
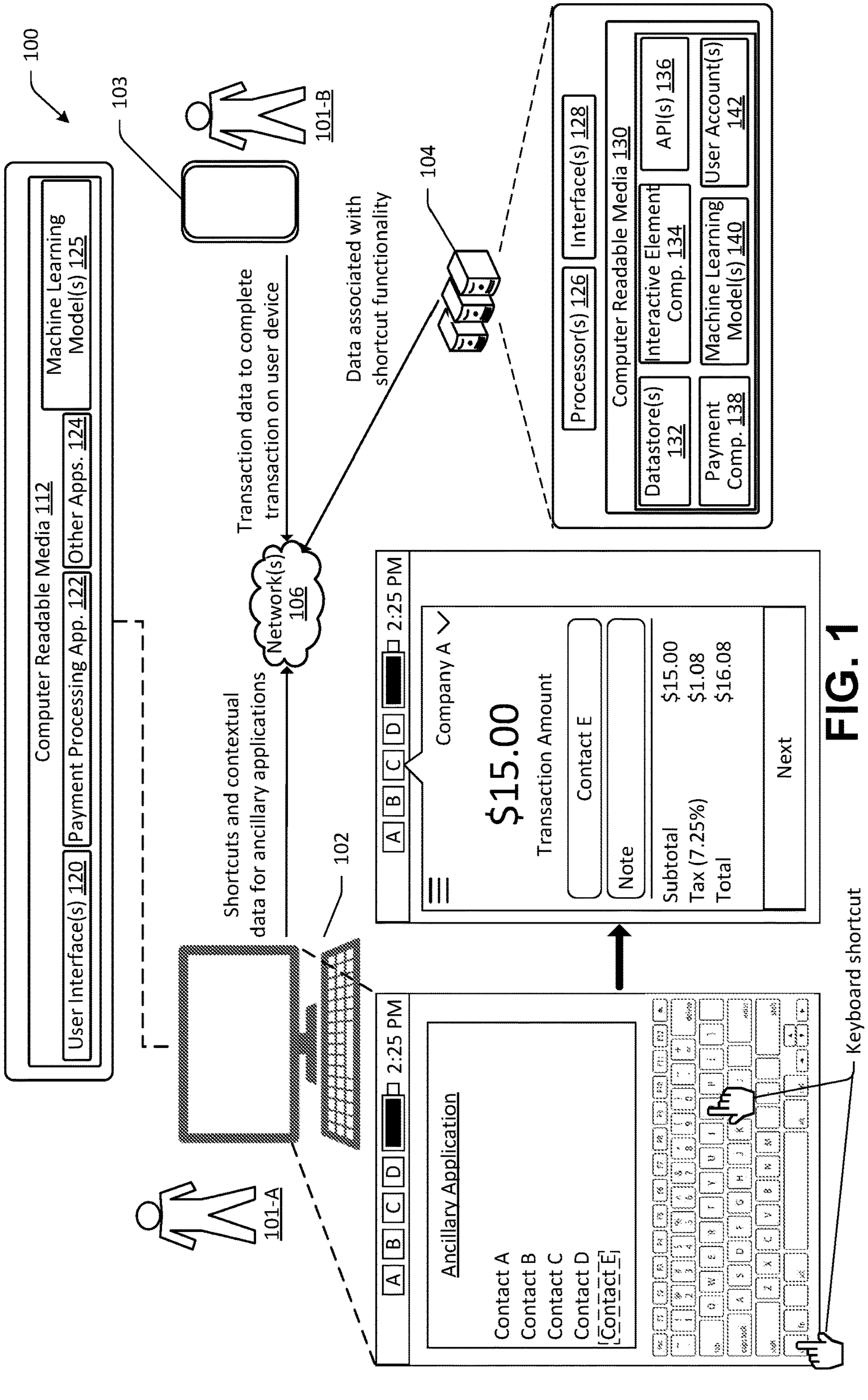
FIG. 1 is an example environment for dynamic cross-application functionality.

Methods and systems described herein are directed to, among other things, integrating applications and seamlessly communicating data between applications using shortcuts, e.g., keyboard shortcuts, touch inputs, gestures, or clicks. In some implementations, the techniques described herein are directed to enabling a computing device on which an application is installed to launch the application and automatically enter selected data into appropriate fields in the application. In some implementations, the techniques described herein are directed to triggering a subset of the functionality of the application from other applications residing on or using the computing device, instead of the entire functionality of the application. For example, a payment processing application may be installed on a computing device of a merchant. The merchant may select a readily accessible icon associated with the payment processing application to launch the application's limited functionalities for use. In examples, use of the payment processing application may include a merchant providing input for a cost associated with a given transaction along with other information associated with the transaction such as customer information, information associated with goods or services sold as part of the transaction, payment instrument information, etc. By so doing, the merchant may conduct a transaction with a customer without any specialized payment hardware, such as a card reader, or without any additional functionalities that are typically associated with the payment processing application, thus greatly reducing computational and memory usage that comes with executing full functionality applications and integrated hardware.

In addition to the payment processing functionality detailed above, the payment processing application may also be configured to integrate with other applications associated with the merchant. For example, the computing device at issue may include a litany of other applications that, at least in part, may be relevant to functionality associated with the payment processing application. By way of example, the computing device may include a loyalty application that tracks customer loyalty data, an inventory application that tracks inventory data associated with the merchant, a card-on-file application that stores payment instrument information associated with customers, a customer application that generates and stores historical data for past transactions with customers, a spreadsheet application that allows users to input values into cells of a spreadsheet, web browsing applications, customer service applications, chat or other communication-related applications, etc. While each of these example applications has its own functionality, at least a portion of that functionality may be relevant to payment processing as performed by the payment processing application. For example, the loyalty application may store a loyalty identifier, points data, discount data, etc. associated with a given customer. Typically, to utilize the data from the loyalty application, a user of the computing device may launch the loyalty application, find the appropriate loyalty data for the customer at issue, remember the data while launching a payment processing application, start a transaction, and then manually type in the loyalty data into an appropriate field of the payment processing application to associate the loyalty data with the transaction at issue. This process is time consuming, error prone, and requires the merchant to manage multiple applications at the same time.

To alleviate these and other computer-centric concerns associated with application management on computing devices, the present disclosure describes the ability to integrate an application, e.g., a payment processing application, with other applications on a computing device such that a merchant may extract and utilize selected data from any of these applications through the use of a shortcut that, when executed, may cause the payment processing application to launch and the selected data to be prefilled in an identified field associated with a transaction. Take for example a spreadsheet application where a merchant may have prepopulated cells of the spreadsheet with information such as identifiers of goods or services offered by the merchant, costs for those goods or services, discount codes, inventory quantities, etc. Utilizing the functionality described herein, the merchant may select, e.g., emphasize, highlight, gesture, copy, etc., a portion of this information for inclusion in a transaction or to refer initiation of a transaction, and optionally, the user, which may be considered a buyer or otherwise a customer, may provide user input corresponding to a predefined shortcut associated with the payment processing application.

When this predefined shortcut input is provided, the computing device may cause the payment processing application to launch (if not already launched), and may cause the selected data from the spreadsheet application to be entered into a field of the payment processing application that corresponds to a data type of the selected data. For example, if the selected data is a description of a to-be-purchased good, the description may be automatically input into a description field in the payment processing application. In another example, if the selected data was a price for the good, the price may be automatically input into a price field in the payment processing application. In one implementation, the selection causes triggering of a specific application relevant to the selection, such relevance is established by context-driven algorithms. For example, if the selected field is “price of an item” financial applications may be suggested, or the last used application with the field may be recommended. In another example, the field is “last appointment” an appointments application may be recommended. By so doing, time is saved because user input requirements are minimized, and the opportunity for human error is reduced by not requiring the same human interactions that would generally be used to transfer data between applications.

The merchant may perform the same or a similar process with respect to other applications on the computing device, such as selecting loyalty data for the customer at issue and providing a shortcut input that causes the loyalty data to be input into a loyalty-related field in the payment processing application. By so doing, the merchant may provide a predefined shortcut input when an ancillary application is in a foreground of the computing device at issue to cause the payment processing application to launch and the selected data to be automatically entered into appropriate fields in the payment processing application. As used herein, the “ancillary application” can be any application other than the payment processing application and may be described as “another application” or a specific application such as a “contacts application,” “loyalty application,” etc. It should be understood that the selected data may be any data that is selected by a user of an ancillary application. Also, it should be understood that multiple ancillary applications may be utilized and may receive input indicating the same or different shortcuts. In these multi-ancillary application instances, each shortcut may indicate which application the selected data should be routed to.

To do so, in an example, a single predefined shortcut may be associated with the payment processing application, such as (in a non-limiting example) selection of the keys Ctrl+Shift+B on a keyboard, concurrently. In this example, the payment processing application may launch and may cause the selected data to be sent from the application being utilized to the payment processing application. The payment processing application may analyze the received data or metadata associated therewith to determine a data type that the data is associated with. For example, when the selected data includes text such as words, the text may be analyzed to determine that the data is a description of goods or services. When the selected data includes numbers, the numbers may be analyzed to determine that the data is a price for the items at issue. In examples, the metadata may include an identifier of the application from which the data was received, which may inform the determination of the data type at issue. For example, if the metadata indicates that the application at issue is a loyalty application, that metadata may indicate that the received data is associated with a loyalty field of the payment processing application. In certain examples, particularly where determination of the appropriate field to enter the selected data is not associated with a high degree of confidence, the payment processing application may display a user interface that includes possible fields for the data to be entered into and may present an overlay or other visualization that identifies the multiple potential fields that the selected data may be entered into along with a keyboard key for each field that, when selected, indicates the merchant’s intent to choose that field for data input. For example, selected data from a spreadsheet application may include text. The payment processing application may determine that the appropriate field for entry of the selected data could be a field related to description of goods or a field associated with an address of a customer. In this example, the user interface may display the goods description field and the customer address field along with an overlay with, for example, the number “1” displayed over or near the goods description field and the number “2” displayed over or near the customer address field. The merchant may then select the appropriate key on the keyboard of the computing device to cause the selected data to be input into the appropriate field.

In other examples, many shortcuts may be provided and each of the shortcuts may be associated with a given field or set of fields in the payment processing application. For example, a first shortcut may cause the payment processing application to receive selected data and to input that selected data into a given field associated with the first shortcut, such as a price field. Use of a second shortcut may cause selected data to be input into a description of goods field. Other shortcuts may be associated with other fields as described herein. By so doing, a handful of shortcuts may be provided to merchants to allow those merchants to, using a single input provided to an ancillary application, launch the payment processing application and have selected data input into one or more fields of the payment processing application.

In some implementations, machine learning techniques may be employed to determine how to process a given shortcut input. For example, a machine learning model may be generated that is configured to determine which field of the payment processing application to input selected data in based at least in part on available data associated with the user input, the selected data, and the application from which the data was selected. A training dataset may be generated that indicates user inputs, selected data, application details, and results data indicating whether a selected field was properly selected. The machine learning model may be trained utilizing the training dataset to generate a trained machine learning model that may be utilized to select an input field when shortcut input is received. This use of machine learning may reduce processing time and lead to more accurate determinations of application fields to input selected data from other applications, even in implementations where the same shortcut is utilized for multiple types of selected data and is input into differing input fields in an ancillary application.

In addition to the above, predefined shortcuts associated with the payment processing application may be utilized to trigger enablement or use of only certain portions of the payment processing application functionality. For example, certain shortcuts or selected data may be utilized to process a transaction and thus a full version of the payment processing application may be launched and utilized. However, in some implementations, certain shortcuts or selected data may be utilized to provide non-transaction related functionality associated with the payment processing application, such as for tax purposes, for accounting purposes, for logging loyalty information, for contacting customers, etc. In these examples, depending on the shortcut utilized or the selected data, receipt of input associated with the shortcut may cause a portion of the payment processing application or a version thereof to launch and be utilized.

In addition to the above, the payment processing application may be enabled to utilize one of multiple methods for processing a transaction once transaction data such as price, payment method, etc. are determined. For example, one transaction processing option is to utilize a payment processing service associated with the payment processing application to process the transaction. To do so, the application may send transaction data for the transaction to the payment processing service to complete payment for the transaction. In this example, the merchant may be registered with the payment processing service to perform the payment processing. In some implementations, the merchant may not be associated with the payment processing service or the computing device may not be configured to communicate with the payment processing service. In these and other implementations, the application may be configured to send a notification with an interactive payment link to a device associated with the customer. The notification may be sent as a text message, email, social media message, or in any other format that the customer may receive the interactive link with. The customer may then select the interactive link, which may cause a browsing application on the customer's device to launch and the transaction information to be prepopulated into a payment user interface associated with the payment processing service or a third party service. The customer may confirm the purchase on the customer device, which may cause the payment processing service to process the payment and complete the transaction. Notifications of transaction status may be sent to the customer device and to the application associated with the merchant. In some implementations, the application may be one of multiple payment processing options for a given merchant. For example, a merchant may have a desktop computing device with the payment process application installed thereon, and the merchant may also have some sort of payment hardware such as a card reading device, POS terminal, etc. In these examples, the merchant may select, as an option, the payment hardware to complete the transaction as if the transaction had started at the payment hardware. The payment hardware may receive the transaction data from the application and may communicate with the payment processing service to complete the transaction.

In addition to the above, the application may be configured to be displayed and utilized differently depending on merchant preferences or uses. For example, after initial setup of the application, the merchant may be "logged in" or otherwise authenticated for a long period of time in comparison to how long a merchant may typically be logged in to an internet browsing session. To illustrate, when a browsing application is utilized to complete payment transactions, the unsecure nature of using browsing applications generally merits the use of timeout limits on the order of a few minutes or a few hours. This requires the merchant to log in or otherwise authenticate the merchant before functionality of the browser service can be utilized. Given that the present application, in examples, is an application that resides on a computing device of the merchant, the timeout limit may be increased given the decrease in security risk that the user of the computing device is not the merchant. In examples, the timeout limit may be set on the order of days, such as 30 days. In examples, comparatively quick authentication processes may be employed with the application, such as by requiring entry of a personal identification number, use of a badge or otherwise an authorized article, or querying a hardware device such as a POS terminal that has been previously associated with the application. Additionally, a merchant may enable a "keep open" option for the application that "pins" the application to a foreground of the computing device regardless of other applications that are being currently utilized. This may enable the merchant to highlight and select data from other applications and when a shortcut is utilized as outlined herein the data input to the payment processing application may be visualized in real time.

Furthermore, at various stages of a transaction, various options associated with a transaction may be made available to the merchant based on other applications used by the merchant, past transaction data, past use of the payment processing application, etc. For example, options for selecting past customers or adding new customers, options for prices, options for discounts, options for shipping types, options for payment instrument use, options for payment instrument input, etc. may be provided. The payment processing application may be configured to identify these options and to provide an overlay or otherwise keyboard input options to dynamically associate with these options. For example, recent customer identifiers, a customer list, and an option for entering a new customer identifier may be displayed on the application and an overlay may be dynamically generated with a keyboard key associated with each of these options. The same may be generated for payment entry methods, such as using a card on file, manually entering card information, recording a cash payment, and recording another type of payment other than cash. Each of these payment entry methods may be associated with a keyboard key as displayed on a user interface of the application. These options and keyboard key overlays may change dynamically and on the fly based at least in part on which options are available for a given transaction and based at least in part on customer information associated with the customer.

By utilizing the payment processing application described herein, merchants and customers may be in the same or different geographic locations, including in other countries, and may still proceed with a transaction in real time. For example, the merchant may be located in a first country and may initiate a transaction on the merchant's payment processing application. A payment interactive link for the transaction may be sent to a customer in another country to complete the transaction. Given this functionality, the payment processing service associated with the payment processing application may be configured to perform currency-related processing to ensure that the appropriate currency given the merchant and customer locations is utilized and displayed for the transaction.

As outlined herein, the development and use of the described payment processing application solves the computer-centric problem of how to securely perform network-based payment processing in a way that allows for integration of multiple, unrelated applications. The integration may be performed by enabling secure communications, such as via one or more application programming interfaces, between the payment processing application and the ancillary applications such that when data is selected from an ancillary application and a predefined shortcut is entered, the selected data is automatically and securely transferred to the payment processing application and input into a field of the payment processing application. In some examples, encryption techniques may be utilized to securely transfer the selected data between applications. Even though the applications are running on the same device, in some examples the transfer of such data may be sensitive and may provide a mechanism for a nefarious actor to obtain the sensitive data. As such, the selected data may be encrypted by the ancillary application prior to sending to the payment processing application. Thereafter, the payment processing application may decrypt the selected data and input the decrypted selected data into an input field as described herein. The functionality described herein physically changes the way that application windows are displayed on a computing device such that the payment processing application is kept in a foreground of the computing device in certain examples and such that relevant data from other applications is still displayed concurrently with the payment processing application. Additionally, the techniques described herein describe the on-the-fly generation of dynamic and user specific notifications for completing payment transactions, as well as options for determining which of several computer-centric options may be selected for completing a payment transaction. Furthermore, the generation and use of shortcuts to facilitate inter-application data sharing is grounded conclusively in a computer environment that could not exist outside of such an environment. Indeed, several of the shortcut operations described herein involve the use of machine learning models and the training of those models to achieve results that a human could not.

Also, transactions such as those described herein require data transmission across disparate devices and systems all within a limited period of time. This would typically lead to networking issues in the network of devices where communication protocols across the various device and system type typically differ. However, utilizing the techniques described herein, a network of user devices and systems such as the payment service may be generated when transactions such as those described herein are identified. To do so, profiles associated with the merchant at issue and the various potential customer devices are identified and parameters for sending and displaying interactive links associated with a given transaction are generated. The established network of devices and system is then utilized to securely send data related to the transaction to the various devices and systems.

Furthermore, the techniques described herein include the generation and training of machine learning models to, among other things, generate time sensitive actionable recommendations, interactive links including interactive links associated with transactions that are initiated using the payment processing application but are concluded on other devices such as customer devices, and to determine what fields of the payment processing application should receive input for a given shortcut usage. Machine learning can also be utilized to determine shortcuts, overlays associated with the payment processing application, available payment types, available receipt types, available transaction mechanisms, etc. The use of specifically trained machine learning models grounds the techniques described herein in a computer-centric environment and produces results that offer improvements over conventional technologies. The models may be trained again and again over time, each time learning new parameters or updating parameter weighting to make the results of those models more accurate, more timely, etc.

In addition to the above, the nature of ecommerce transactions is time sensitive. For example, in a non-ecommerce transaction a user may go to a store, pick out an available item, and initiate a transaction at a cash register at any point thereafter. Ecommerce transactions, to the contrary, involve thousands of potential customers across thousands of locations purchasing items. As such, item availability changes second by second, and the display of item availability may similarly be updated dynamically, on-the-fly, and based on potentially hundreds or thousands of user sessions involving a given merchant. These computer-centric problems are minimized utilizing the techniques described herein by allowing for the on-the-fly ecommerce transactions to be performed within a limited time window.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment for dynamic cross-application functionality, according to an embodiment described herein. In one implementation, the environment 100 may include a merchant 101-A associated with a merchant device 102, a customer 101-B associated with a customer device 103, and a payment processing service 104, which can communicate via network(s) 106.

Each of the devices can comprise one or more computing devices. Additional details associated with the merchant device 102, the customer device 103, the payment processing service 104, and the network(s) 106 are described below with reference to FIGS. 9-13.

The merchant device 102 may include one or more components such as one or more processors, one or more network interfaces, computer-readable media (CRM) 112, one or more microphones, one or more speakers, and/or one or more displays. The microphones may be configured to receive audio input from the environment 100 and to generate corresponding audio data, which may be utilized as discussed herein. The speakers may be configured to output audio. The displays may be configured to present graphical user interfaces. In some examples, the displays can output images, videos, or the like via such graphical user interfaces.

The customer device 103 may include the same or similar components as the merchant device 102 and may perform the same or similar functions, albeit from the perspective of a customer. In examples, the merchant device 102 may be a desktop computing device such as a laptop computer, while the customer device 103 may be a smart phone, wearable device, or other mobile device. It should be understood that the merchant device 102 may be any computing device and need not necessarily be a desktop computer. In addition, the customer device 103 may also be any computing device and need not necessarily be a mobile device.

The CRM 112 of the merchant device 102 may include one or more applications or other components. For example, the one or more applications or other components can include one or more user interfaces 120, a payment processing application 122, one or more other applications 124, and/or one or more machine learning models 125. A user interface 120 can be included in the payment processing application 122 as an interstitial, widget, or pop-up display. The CRM 112 can include additional or alternative applications 124 such as a music streaming application, a messaging application, an email application, a forum application, a spreadsheet application, a loyalty application, an inventory application, or the like. In some examples, the applications 122, 124 can be provided by a same service provider (e.g., the payment processing service) or different service providers, such as the payment processing service and one or more third-party service providers.

The applications or other components may be configured to execute in the foreground and background of the merchant device 102. For example, the payment processing application 122 may be configured to execute in the foreground when a user is actively engaged in one or more of the functionalities of the payment processing application 122. In some implementations, the payment processing application 122 may be configured to execute in the background when a user is not actively engaged in one or more of the functionalities, but the payment processing application 122 is still "open" and is capable of communicating with other applications 124 on the merchant device 102 and/or with payment processing service 104. For example, one of the other applications 124 may be executing in the foreground and an interaction with an interactive element or a shortcut as described in more detail herein may occur. The payment processing application 122, running in the background, may be caused to be displayed in the foreground in response to selection of the interactive element or the shortcut in the other application 124. In some such examples, the payment processing application 122 can transition to the foreground to perform payment operations or can remain in the background and payment operations can be performed without the payment processing application 122 transitioning to the foreground.

In examples, the payment processing service 104 may determine one or more ancillary applications 124 that are identified as being associated with the payment processing application 122. For example, the functionalities and abilities of the ancillary applications 124 may be determined utilizing metadata associated with the ancillary applications 124 or through parsing of available resources describing the ancillary applications 124. Thereafter, the payment processing service 104 may send, to the one or more ancillary applications 124, data configured to cause the one or more ancillary applications 124 to communicate with the payment processing application 122 upon selection of the shortcut. In these examples, the data may include indications of the shortcuts at issue and protocols for the ancillary application 124 to communicate with the payment processing application 122. The data may also cause the payment processing application 122 to receive the user input that is received by the ancillary application 124 such that the payment processing application 122 determines when that user input represents a shortcut and when data from the ancillary application 124 is to be extracted and included in the payment processing application 122. In examples, selection of the predefined shortcut may cause the ancillary application 124 to communicate with the payment processing application 122, such as via an application programming interface 136 provided by the payment processing service 104. For example, when the shortcut is selected, the ancillary application 124 may call the payment processing application 122 to be enabled, and the ancillary application 124 may send data to the payment processing application 122 that indicates the selected data and the shortcut input that was received. Once this data is received by the payment processing application 122, the payment processing application 122 may input the selected data into an input field of the payment processing application 122 as described herein.

The payment processing service 104, which can be associated with one or more computing devices, such as server computing devices, may include components such as one or more processors 126, one or more network interfaces 128, and/or CRM 130. The CRM 130 may include one or more components such as, for example, one or more datastores 132, an interactive element component 134, one or more application programming interfaces (APIs) 136, a payment component 138, one or more machine learning models 140, and/or one or more user accounts 142. These components will be described below by way of example.

In at least one example, the payment processing service 104 can expose functionality and/or services via the one or more APIs 136, thereby enabling functionality and/or services described herein to be integrated into various functional components of the environment 100. The API(s) 136, which can be associated with the payment processing service 104, can expose functionality described herein and/or avail payment services to various functional components associated with the environment 100. At least one of the API(s) 136 can be a private API, thereby availing services and/or functionalities to functional components (e.g., applications, etc.) that are developed internally (e.g., by developers associated with the payment service). At least one of the API(s) 136 can be an open or public API, which is a publicly available API that provides third-party developers (e.g., social media platforms, spreadsheet application developers, etc., as described herein) with programmatic access to a proprietary software application or web service of the payment service. That is, the open or public API(s) can enable functionality and/or services of the payment service to be integrated into one or more applications. The API(s) 136 can include sets of requirements that govern how applications, or other functional components, can interact with one another.

In some examples, the payment processing service 104 can provide third-party entities with a software developer kit ("SDK") that may utilize functionality exposed by the API(s) 136. The SDK can include software development tools that allow a third-party developer (i.e., a developer that is separate from the payment service) to include functionality and/or avail services as descried herein. The SDK and/or the API(s) 136 may include one or more libraries, programming code, executables, other utilities, and documentation that allows a developer to directly include functionality and/or avail services described herein within an application.

The datastore(s) 132 can store, among other types of data, user profiles. For instance, a user profile of the user can store payment data associated with payment instrument(s) or user account(s) of a user. In some examples, an account maintained by the payment processing service 104 on behalf of the user can be mapped to, or otherwise associated with, the user profile. Such an account can be associated with a stored balance maintained by the payment processing service 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. Additional details associated with data that can be stored in association with user profiles are provided below.

The interactive element component 134 may be configured to generate interactive elements associated with the functionality of the payment processing application 122. For example, when a merchant 101-A is ready to proceed with a transaction for the sale of a good or service, the merchant 101-A may have a variety of options for doing so. One of those options may be to send a notification to the customer device 103 with an interactive link to complete the transaction at issue. To do so, the interactive element component 134 may be called to generate the interactive link and to provide the interactive link to the customer device 103. The interactive elements described herein can correspond to a link, a deep link, a bar code, a QR code, or any other element that is capable of interaction. In some examples, the interactive element can have data embedded therein to trigger actions to be performed, such as causing the customer device 103 to open a browsing application and cause the browsing application to navigate to a uniform resource locator associated with the payment processing service 104 or the transaction at issue. Additionally, data object tracking or transaction state tracking may be performed as described herein. In these examples, the interactive element component 134 may generate one or more interactive elements based at least in part on data objects that are tracked or a given state of a transaction.

The remaining features of the environment 100 as shown in FIG. 1 will be described below by way of example.

The payment processing application 122 may also be configured to integrate with other applications 124 associated with the merchant 101-A. For example, the computing device 102 at issue may include a litany of other applications 124 that, at least in part, may be relevant to functionality associated with the payment processing application 122. By way of example, the computing device, described herein as the merchant device 102, may include a loyalty application that tracks customer loyalty data, an inventory application that tracks inventory data associated with the merchant 101-A, a card-on-file application that stores payment instrument information associated with customers 101-B, a customer application that generates and stores historical data associated with past transactions with customers 101-B, a spreadsheet application that allows users to input values into cells of a spreadsheet, web browsing applications, customer service applications, chat or other communication-related applications, etc. While each of these example applications 124 has its own functionality, at least a portion of that functionality may be relevant to payment processing as performed by the payment processing application 122. For example, the loyalty application may store a loyalty identifier, points data, discount data, etc. associated with a given customer 101-B. To utilize the data from the loyalty application, a user of the computing device 102, absent the innovations described herein, would launch the loyalty application, find the appropriate loyalty data for the customer 101-B at issue, remember the data while launching a payment processing application, start a transaction, and then manually type in the loyalty data into an appropriate field of the payment processing application to associate the loyalty data with the transaction at issue. This process is time consuming, error prone, and requires the merchant 101-A to manage multiple applications at the same time.

To alleviate these and other computer-centric concerns associated with application management on computing devices, the present disclosure describes the ability to integrate the payment processing application 122 with the other applications 124 on a computing device 102 such that a merchant 101-A may extract and utilize selected data from any of these applications through the use of a shortcut that, when executed, may cause the payment processing application 122 to launch and the selected data to be prefilled in the appropriate field associated with a transaction. Take for example a spreadsheet application, where a merchant 101-A may have prepopulated cells of the spreadsheet with information such as identifiers of goods or services offered by the merchant 101-A, costs for those goods or services, discount codes, inventory quantities, etc. Utilizing the functionality described herein, the merchant 101-A may highlight or otherwise select a portion of this information for inclusion in a transaction and the merchant 101-A may provide user input corresponding to a predefined shortcut associated with the payment processing application 122. As used herein, "highlight" may include any user input data that emphasizes, selects, or otherwise indicates user input has been received in relation to a given portion of information. When this predefined shortcut input is provided, the computing device 102 may cause the payment processing application 122 to launch (if not already launched), and may cause the selected data from the spreadsheet application to be entered into a field of the payment processing application 122 that corresponds to a data type of the selected data. For example, if the selected data was a description of a to-be-purchased good, the description may be automatically input into a description field in the payment processing application 122. In some implementations, if the selected data was a price for the good, the price may be automatically input into a price field in the payment processing application 122. The merchant 101-A may perform the same or a similar process with respect to other applications 124 on the computing device 102, such as selecting loyalty data for the customer 101-B at issue and providing a shortcut input that causes the loyalty data to be input into a loyalty-related field in the payment processing application 122. By so doing, the merchant 101-A may provide a predefined shortcut input when an application is in a foreground of the computing device 102 at issue to cause the payment processing application 122 to launch and the selected data to be automatically entered into appropriate fields in the payment processing application 122.

To do so, in an example, a single predefined shortcut may be associated with the payment processing application 122, such as (in a non-limiting example) selection of Ctrl+Shift+B on a keyboard concurrently. In this example, the payment processing application 122 may launch and may cause the selected data to be sent from the application 124 being utilized to the payment processing application 122. The payment processing application 122 may analyze the received data or metadata associated therewith to determine a data type that the data is associated with. For example, when the selected data includes text such as words the text may be analyzed to determine that the data is a description of goods or services. When the selected data includes numbers, the numbers may be analyzed to determine that the data is a price for the goods or services. In examples, the metadata may include an identifier of the application 124 from which the data was received, which may inform the determination of the data type at issue. For example, if the metadata indicates that the application 124 at issue is a loyalty application, that metadata may indicate that the received data is associated with a loyalty field of the payment processing application 122. In certain examples, particularly where determination of the appropriate field to enter the selected data is not associated with a high degree of confidence, the payment processing application 122 may display a user interface 120 that includes possible fields for the data to be entered into and may present an overlay or other selection visualization that identifies the multiple potential fields that the selected data may be entered into along with a keyboard key for each field that, when selected, indicates the merchant's intent to choose that field for data input. For example, selected data from a spreadsheet application may include text. The payment processing application 122 may determine that the appropriate field for entry of the selected data could be the field related to description of goods or the field associated with an address of a customer 101-B. In this example, the user interface 120 may display the goods description field and the customer address field along with an overlay with, for example, the number "1" displayed over or near the goods description field and the number "2" displayed over or near the customer address field. The merchant 101-A may then select the appropriate key on the keyboard of the computing device 102 to cause the selected data to be input into the appropriate field.

In some implementations, many shortcuts may be provided and each of the shortcuts may be associated with a given field or set of fields in the payment processing application 122. For example, a first shortcut may cause the payment processing application 122 to receive selected data and to input that selected data into a given field associated with the first shortcut, such as a price field. Use of a second shortcut may cause selected data to be input into a description of goods field. Other shortcuts may be associated with other fields as described herein. By so doing, a handful of shortcuts may be provided to merchants 101-A to allow those merchants 101-A to, using a single input, launch the payment processing application 122 and have selected data input into one or more fields of the payment processing application 122.

In some implementations, machine learning techniques may be employed to determine how to process a given shortcut input. For example, a machine learning model 125, 140 may be generated that is configured to determine which field of the payment processing application 122 to input selected data in based at least in part on available data associated with the user input, the selected data, and the application 124 from which the data was selected. A training dataset may be generated that indicates user inputs, selected data, application details, and results data indicating whether a selected field was properly selected. The machine learning model 140 may be trained utilizing the training dataset to generate a trained machine learning model that may be utilized to select an input field when shortcut input is received. In some examples, the payment processing service 104 may receive, over a period of time, user data from multiple users indicating input fields where input is provided from ancillary applications. This data associated with multiple users, including users other than the customer in question, may be utilized by the machine learning models 125, 140 to determine input fields that should correspond to certain shortcuts.

In some implementations, shortcut options may be displayed to a user of the payment processing application 122 and the user may select which shortcuts to utilize or may determine which input fields are to be associated with various shortcuts. Additionally, the shortcut options may include an indication of the ancillary application 124 to be associated with a given shortcut.

As shown specifically with respect to FIG. 1, an ancillary application 124 may be contacts application that includes contact information for multiple contacts. FIG. 1 illustrates that the contacts application includes Contacts A-E and shows that the user has highlighted Contact E. Additionally, user input data has been received indicating selection of a shortcut, here Ctrl+O. This shortcut may be associated with the payment processing application 122 and may cause the payment processing application 122 to initiate. Additionally, the selected portion, here Contact E, may be automatically input into a field associated with the payment processing application 1122. As shown in FIG. 1, the input field may be a customer field or otherwise a contact field that is auto-populated with Contact E. In some examples, when the contacts field is filled using a shortcut as described herein, the payment processing service 104 may automatically send a notification with an interactive link to the customer device 103 such that the customer may proceed with the transaction using the interactive link.

In addition to the above, predefined shortcuts associated with the payment processing application 122 may be utilized to trigger enablement or use of only certain portions of the payment processing application 122 functionality. For example, certain shortcuts or selected data may be utilized to process a transaction and thus a full version of the payment processing application 122 may be launched and utilized. However, in some implementations, certain shortcuts or selected data may be utilized to perform non-transaction related functionality associated with the payment processing application 122, such as for tax purposes, for accounting purposes, for logging loyalty information, for contacting customers, etc. In these examples, depending on the shortcut utilized or the selected data, receipt of input associated with the shortcut may cause a portion of the payment processing application 122 or a version thereof to launch and be utilized. The enablement of only certain portions of the payment processing application 122 functionality saves in computing resources and processing power by not requiring enablement of all the functionality of the payment processing application 122. When determining what portion of the functionality it is to be enabled, the payment processing application 122 may utilize the selected input, the shortcut that was provided, or data known about the merchant in question or the use of the payment processing application 122. For example, if the merchant is currently involved in processing a transaction and selected data is received via shortcut from a contacts application, only functionality associated with transaction processing may be enabled. In some implementations, the shortcut may be associated with storing loyalty information. In this example, only the portion of the payment processing application 122 associated with storing data may be enabled while other functionality such as payment processing functionality may not be enabled.

In addition to the above, the payment processing application 122 may be enabled to utilize one of multiple methods for processing a transaction once transaction data such as price, payment method, etc. are determined. For example, one transaction processing option is to utilize the payment processing service 104 associated with the payment processing application 122 to process the transaction. To do so, the application 122 may send transaction data for the transaction to the payment processing service 104 to complete payment for the transaction. In this example, the merchant may be registered with the payment processing service 104 to perform the payment processing. The payment component 138 of the payment processing service 104 may receive the transaction data from the merchant device 102 and may facilitate processing of the transaction. Part of the operations performed by the payment component 138 may be to call one or more user accounts 142 associated with the customer 101-B at issue to deduct or withdrawal funds to satisfy payment of the transaction.

In some implementations, the merchant 101-A may not be associated with the payment processing service 104 or the computing device 102 may not be configured to communicate with the payment processing service 104. In these and other implementations, the application 122 may be configured to send a notification with an interactive payment link to a device 103 associated with the customer 101-B. The notification may be sent as a text message, email, social media message, or in any other format that the customer 101-B may receive the interactive link with. The customer 101-B may then select the interactive link, which may cause a browsing application on the customer's device 103 to launch and the transaction information to be prepopulated into a payment user interface associated with the payment processing service 104. The customer 101-B may confirm the purchase on the customer device 103, which may cause the payment processing service 104 to process the payment and complete the transaction. Notifications of transaction status may be sent to the customer device 103 and the application 122 associated with the merchant 101-A. In some implementations, the application 122 may be one of multiple payment processing options for a given merchant 101-A. For example, a merchant 101-A may have a desktop computing device with the payment processing application 122 installed thereon, and the merchant 101-A may also have some sort of payment hardware such as a card reading device, POS terminal, etc. In these examples, the merchant 101-A may select, as an option, the payment hardware to complete the transaction as if the transaction had started at the payment hardware. The payment hardware may receive the transaction data from the application 122 and may communicate with the payment processing service 104 to complete the transaction.

As described herein, shortcuts may be utilized to extract data from various ancillary applications 124 and to input that data into fields associated with a transaction in the payment processing application 122. In some examples, the shortcuts may be utilized to input all of the data to complete a transaction, and the transaction may proceed automatically upon the transaction-related fields being filled. In examples, the payment component 138 may determine that payment fields required for facilitating the transaction are filled based at least in part on the selected data being input into the input fields from the ancillary applications 124. When this occurs, the payment component 138 may facilitate the transactions by sending transaction data to the payment processing service 104 or by sending a notification with an interactive link to the customer device 103 for completing the transaction.

In addition to the above, the application 122 may be configured to be displayed and utilized differently depending on merchant preferences or uses. For example, after initial setup of the application 122, the merchant 101-A may be "logged in" or otherwise authenticated for a long period of time in comparison to how long a merchant 101-A may typically be logged in to an internet browsing session. To illustrate, when a browsing application is utilized to complete payment transactions, the unsecure nature of using browsing applications generally merits the use of timeout limits on the order of a few minutes or a few hours. This requires the merchant 101-A to log in or otherwise authenticate the merchant 101-A before functionality of the browser service can be utilized. Given that the present application is an application that resides on a computing device 102 of the merchant 101-A, the timeout limit may be increased given the decrease in security risk that the user of the computing device 102 is not the merchant 101-A. In examples, the timeout limit may be set on the order of days, such as 30 days. In examples, comparatively quick authentication processes may be employed with the application 122, such as by requiring entry of a personal identification number, use of a badge or otherwise an authorized article, or querying a hardware device such as a POS terminal that has been previously associated with the application. Additionally, a merchant 101-A may enable a "keep open" option for the application 122 that "pins" the application 122 to a foreground of the computing device 102 regardless of other applications 124 that are being currently utilized. This may enable the merchant 101-A to highlight and select data from other applications 124 and when a shortcut is utilized as outlined herein the data input to the payment processing application 122 may be visualized in real time.

Furthermore, at various stages of a transaction, various options associated with a transaction may be made available to the merchant 101-A based on other applications 124 used by the merchant, past transaction data, past use of the payment processing application 122, etc. For example, options for selecting past customers 101-B or adding new customers 101-B, options for prices, options for discounts, options for shipping types, options for payment instrument use, options for payment instrument input, etc. may be provided. The payment processing application 122 may be configured to identify these options and to provide an overlay or otherwise keyboard input options to dynamically associate with these options. For example, recent customer identifiers, a customer list, and an option for entering a new customer identifier may be displayed on the application 122 and an overlay may be dynamically generated with a keyboard key associated with each of these options. The same may be generated for payment entry methods, such as using a card on file, manually entering card information, recording a cash payment, and recording another type of payment. Each of these payment entry methods may be associated with a keyboard key as displayed on a user interface 120 of the application 122. These options and keyboard key overlays may change dynamically and on the fly based at least in part on which options are available for a given transaction and based at least in part on customer information associated with the customer 101-B.

By utilizing the payment processing application 122 described herein, merchants 101-A and customers 101-B may be in the same or different geographic locations, including in other countries, and may still proceed with a transaction in real time. For example, the merchant 101-A may be located in a first country and may initiate a transaction on the merchant's payment processing application 122. A payment interactive link for the transaction may be sent to a customer 101-B in another country to complete the transaction. Given this functionality, the payment processing service 104 associated with the payment processing application 122 may be configured to perform currency-related processing to ensure that the appropriate currency given the merchant and customer locations is utilized and displayed for the transaction.

In some implementations, the methods and systems described herein can be integrated with voice services (e.g. Amazon's ALEXA®, Apple's SIRI®, or Microsoft's CORTANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Figure 2:
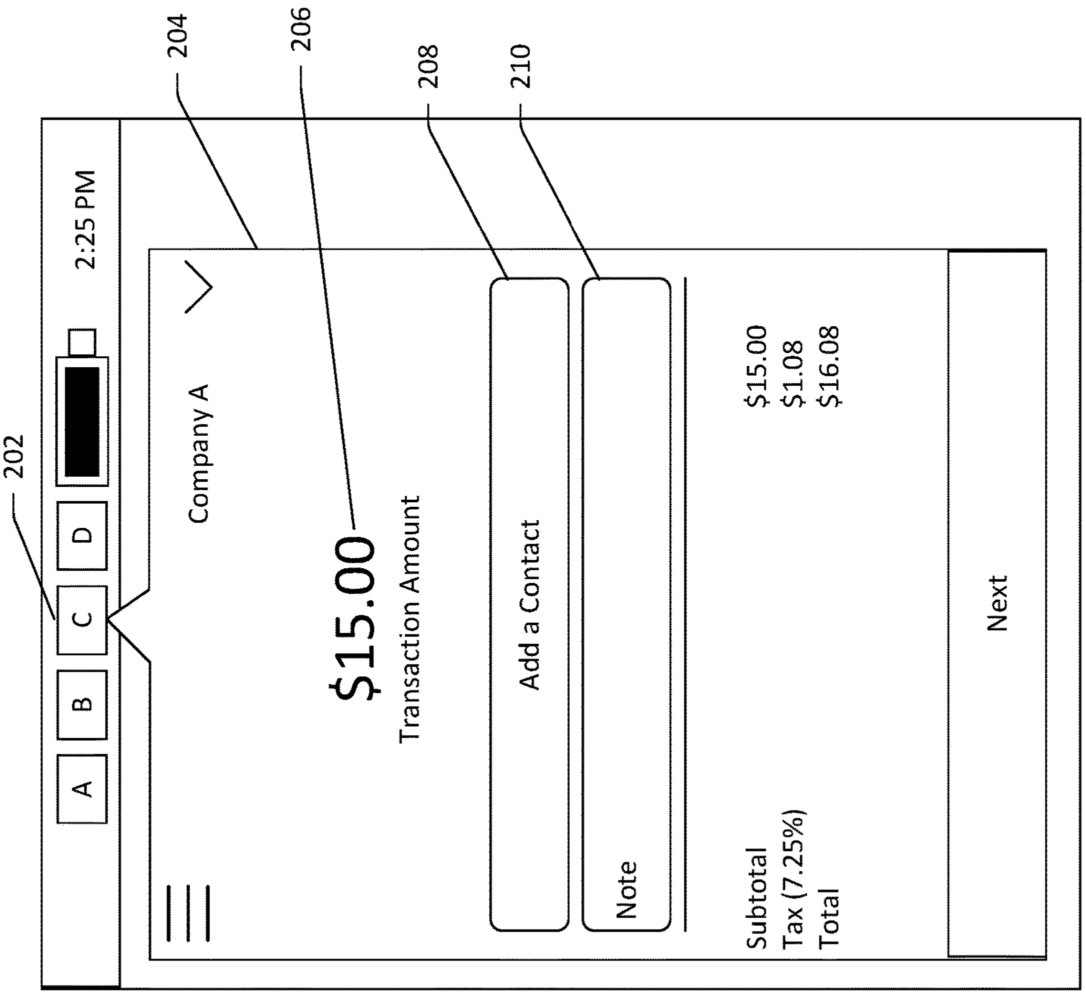
FIG. 2 is an example user interface where a payment processing application may be launched and utilized.

FIG. 2 is an example user interface where a payment processing application may be launched and utilized. The payment processing application as described in FIG. 2 may be the same or similar to the payment processing application 122 described with respect to FIG. 1.

As shown in FIG. 2, an identifier 202 of the payment processing application may be "pinned" to a desktop of the computing device of a merchant. Selection of the identifier may cause the application to launch (if not already launched) and a user interface 204 to be displayed. The user interface 204 may provide functionality to allow for entry of information associated with a transaction, such as a price field 206 for entry of a price of goods or services to be purchased, a customer field 208 for entry of information associated with a customer, a note field 210 that may allow the user to input text corresponding to a note for the transaction, or other field to be associated with a transaction such as a loyalty information field, a discount field, etc.

As described elsewhere herein in more detail, some or all of these fields may be populated utilizing shortcuts from other applications running on the merchant device. In short, the merchant may have another application in a foreground of the merchant device and may select a portion of data in that other application. The merchant may provide a shortcut input that causes the payment processing application to receive the selected data and to input the selected data into the appropriate field of the payment processing application. Additional details on utilizing shortcuts to extract data from a given application an input the extracted data into the payment processing application are provided with respect to FIG. 1, above.

Figure 3:
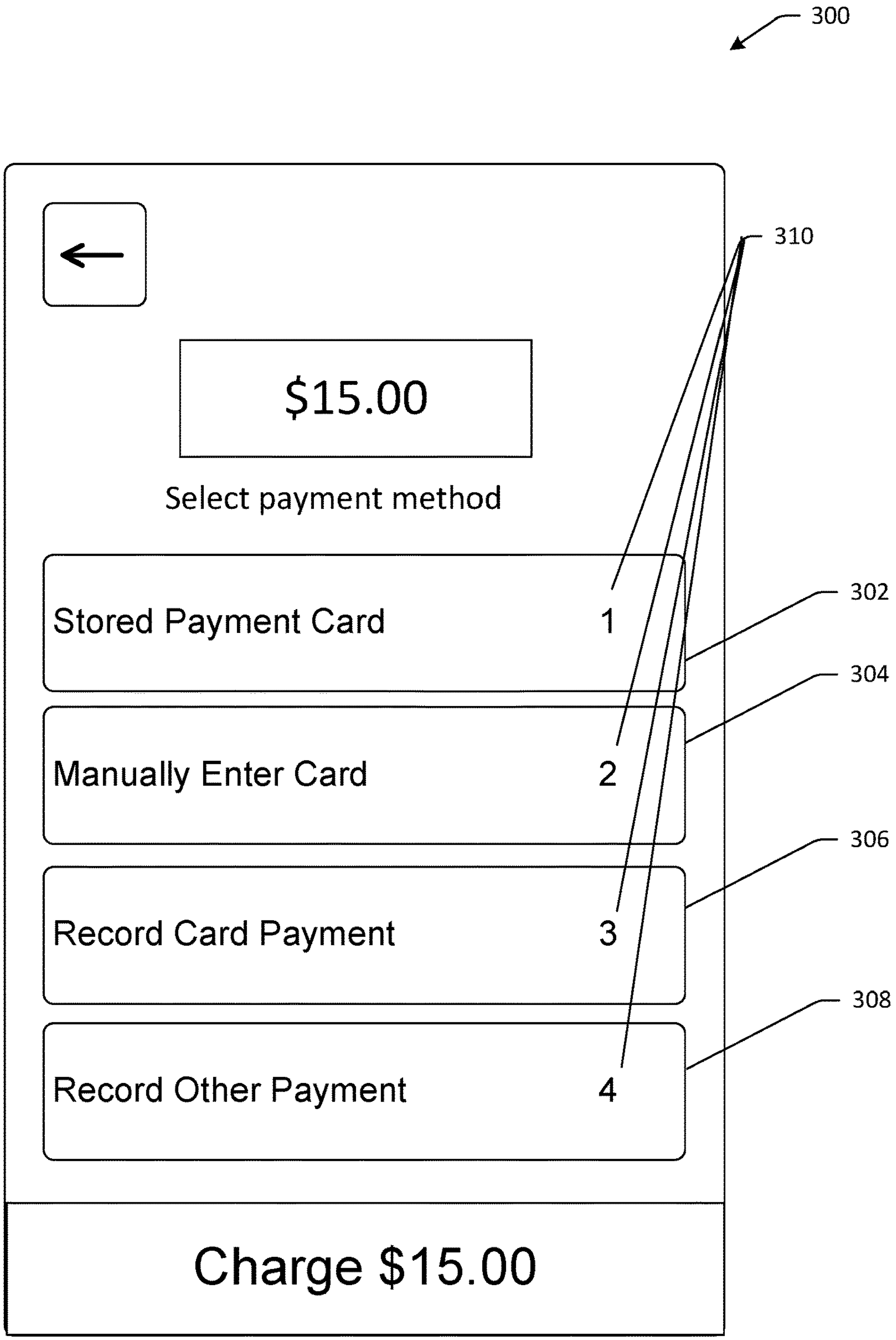
FIG. 3 is an example user interface where payment entry options may be presented via a payment processing application.

FIG. 3 is an example user interface 300 where payment entry options may be presented via a payment processing application. The payment processing application as described in FIG. 3 may be the same or similar to the payment processing application 122 described with respect to FIG. 1.

As shown in FIG. 3, at various stages of a transaction, various options associated with a transaction may be made available to the merchant based on other applications used by the merchant, past transaction data, past use of the payment processing application etc. For example, options for selecting past customers or adding new customers may be provided, options for prices, options for discounts, options for shipping types, options for payment instrument use, options for payment instrument input, etc. may be provided. The payment processing application may be configured to identify these options and to provide an overlay or otherwise keyboard input options to dynamically associate with these options.

For example, recent customer identifiers, a customer list, and an option for entering a new customer identifier may be displayed on the application and an overlay may be dynamically generated with a keyboard key associated with each of these options. The same may be generated for payment entry methods as shown specifically in FIG. 3, such as a first option 302 for using a card on file, a second option 304 for manually entering card information, a third option 306 for recording a cash payment, and fourth option 308 for recording another type of payment. Each of these payment entry methods may be associated with a keyboard key 310 as displayed on a user interface of the application. These options 320-308 and keyboard key overlays 310 may change dynamically and on the fly based at least in part on which options are available for a given transaction and based at least in part on customer information associated with the customer.

In the specific example of FIG. 3, a "1" is associated with an option 302 to utilize a card on file for the customer at issue, a "2" is associated with an option 304 to manually enter card information, a "3" is associated with an option 306 to record a cash payment, and a "4" is associated with an option 308 to record another type of payment. In this example, the merchant may press the desired key on the keyboard to initiate entry of payment information utilizing the chosen option.

Figure 4:
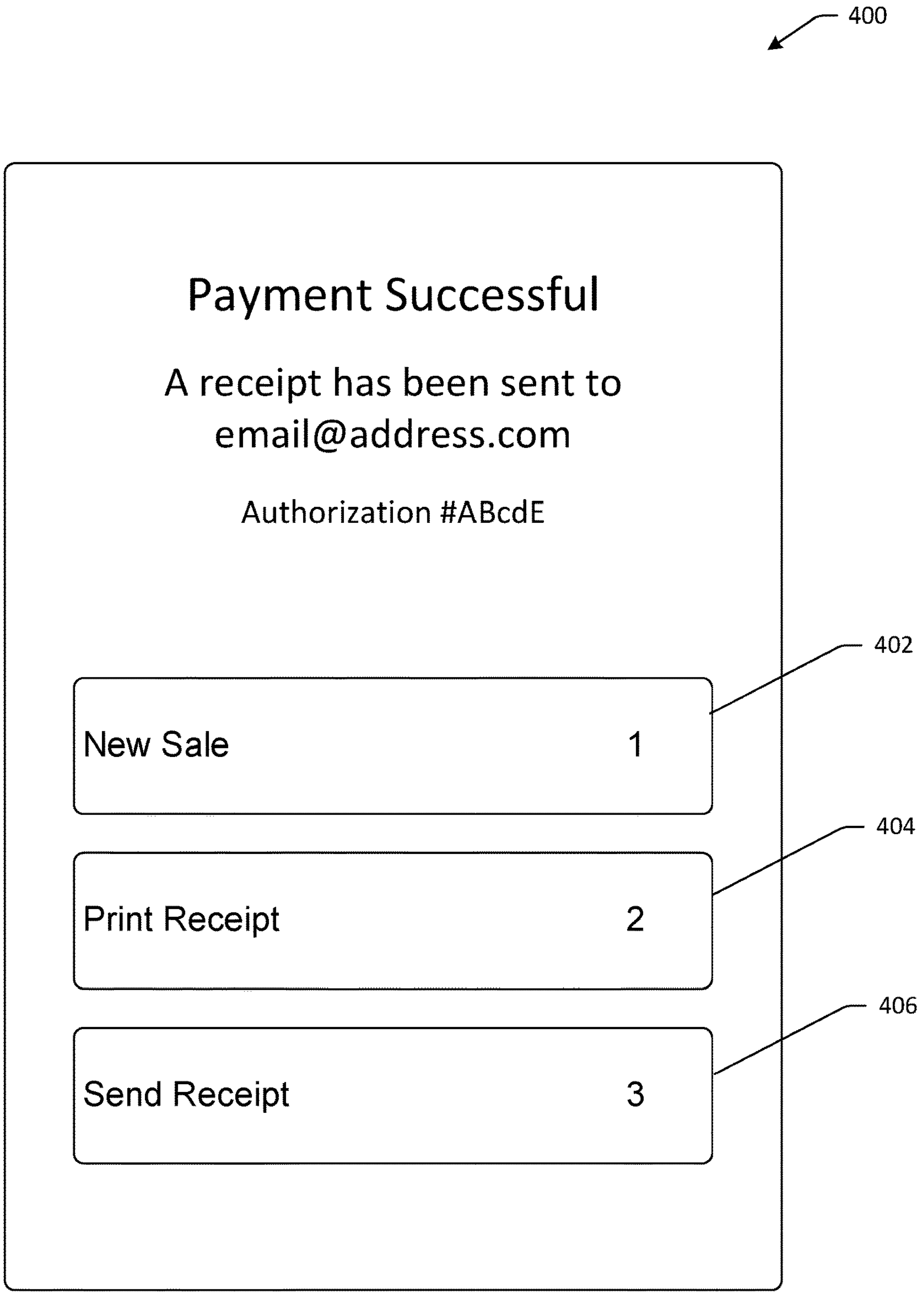
FIG. 4 is an example user interface where options for proceeding after a payment transaction is successfully completed are presented in a payment processing application.

FIG. 4 is an example user interface 400 where options for proceeding after a payment transaction is successfully completed are presented in a payment processing application. The payment processing application as described in FIG. 4 may be the same or similar to the payment processing application 122 described with respect to FIG. 1.

As shown in FIG. 4, at various stages of a transaction, various options associated with a transaction may be made available to the merchant based on other applications used by the merchant, past transaction data, past use of the payment processing application etc. For example, options associated with actions to be performed after a payment is successfully completed may be displayed. As shown in FIG. 4, an indicator that a successful payment has been made may be displayed along with a notation about one or more actions that have been performed already, such as a notation that a receipt has already been sent to an email address associated with the customer at issue. The user interface 400 may also include an authorization indicator that may be utilized to share, such as by way of a hashtag, the transaction with others.

Additionally, the user interface 400 may include options such as a new sale option 402, a print receipt option 404, and a send receipt option 406. Each of these options may be associated with a key on a keyboard such that a merchant may press the desired key to cause the action to be performed by the payment processing application. Utilizing the example from FIG. 4, a "1" may be associated with the new sale option 402, a "2" may be associated with the print receipt option 404, and a "3" may be associated with the send receipt option 406. As described herein, these shortcuts may change dynamically based at least in part on the options available for a given transaction and for a given merchant. For example, hardware for printing a receipt may not be available or the customer may be in a remote location from the merchant.

In these and other implementations, the print receipt option may not be displayed or may be displayed in a different order than as depicted in FIG. 4. Additionally, the keyboard being utilized may have only certain keys and the payment processing application may utilize keyboard configuration information to dynamically determine what key representations to display on the user interface 400 as shortcuts.

Figure 5:
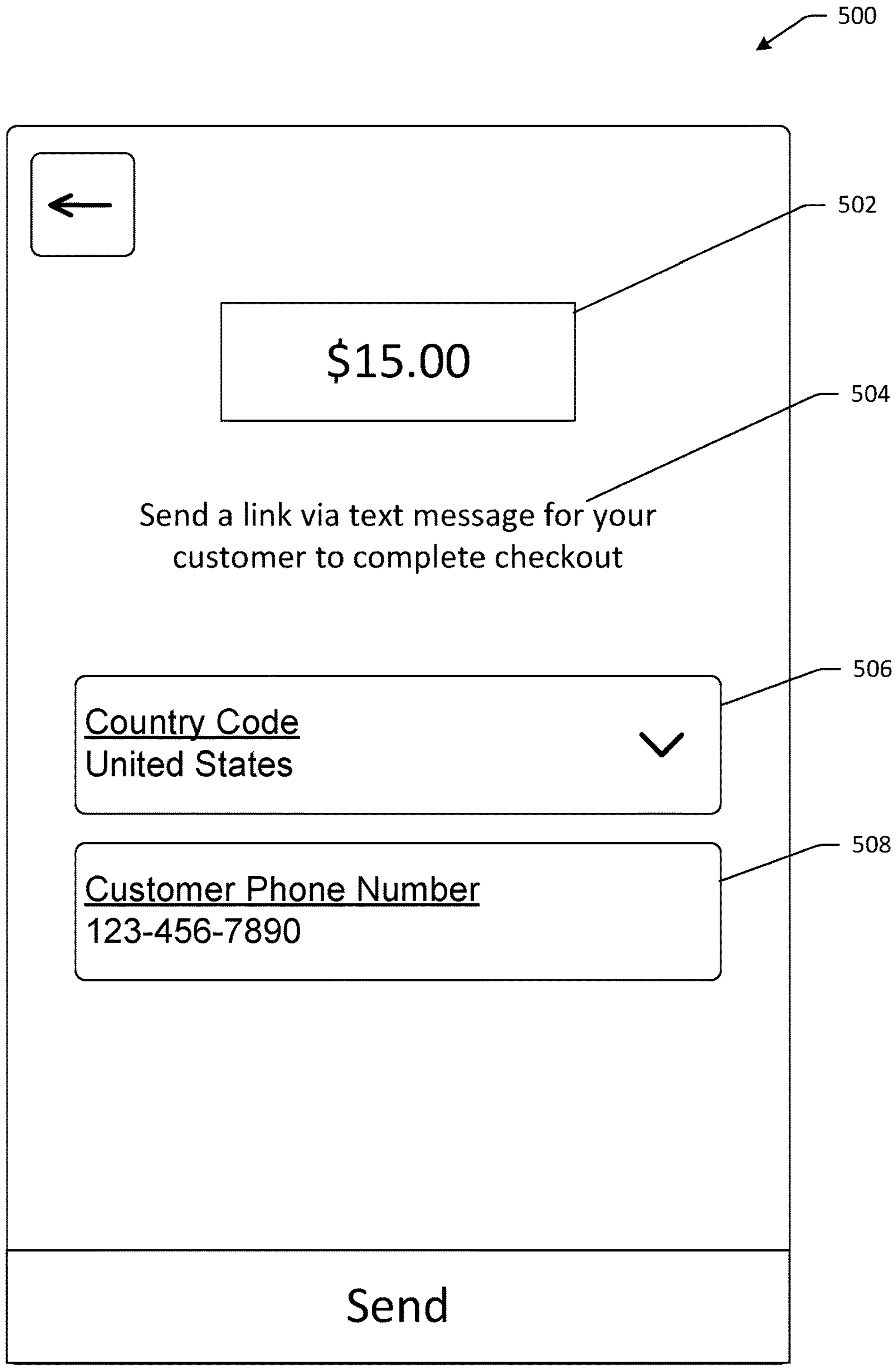
FIG. 5 is an example user interface where completion of a transaction may be performed by sending a notification with an interactive link to a customer.

FIG. 5 is an example user interface 500 where completion of a transaction may be performed by sending a notification with an interactive link to a customer. The payment processing application as described in FIG. 5 may be the same or similar to the payment processing application 122 described with respect to FIG. 1.

As shown in FIG. 5, once information for a transaction has been entered, the transaction may proceed based on numerous options. For example, one transaction processing option is to utilize a payment processing service, such as the payment processing service 104 from FIG. 1, associated with the payment processing application to process the transaction. To do so, the application may send transaction data for the transaction to the payment processing service to complete payment for the transaction. In this example, the merchant may be registered with the payment processing service to perform the payment processing.

In some implementations, the merchant may not be associated with the payment processing service or the computing device may not be configured to communicate with the payment processing service. In these and other implementations, the application may be configured to send a notification with an interactive payment link to a device associated with the customer. The notification may be sent as a text message, email, social media message, or in any other format that the customer may receive the interactive link with. To do so, the user interface 500 of the payment processing application may display information associated with the transaction, such as an indicator of a price 502 for the transaction along with a notation 504 indicating that information is to be utilized to send a link to the customer at issue. Fields for receiving contact information for the customer may be displayed via the user interface 500 and once the merchant provides that input the application or the payment processing service described herein may send the electronic communication with the interactive link to the customer. Here, the fields may include a country code field 506 and a customer phone number field 508. As outlined herein, data associated with customer contact information may be stored in association with another application residing on the merchant computing device, and in these examples a shortcut may be utilized to select data in the other application and input that data into the appropriate field in the payment processing application, as described in more detail elsewhere herein.

The customer may then select the interactive link, which may cause a browsing application on the customer's device to launch and the transaction information to be prepopulated into a payment user interface associated with the payment processing service. The customer may confirm the purchase on the customer device, which may cause the payment processing service to process the payment and complete the transaction. Notifications of transaction status may be sent to the customer device and the application associated with the merchant. In some implementations, the application may be one of multiple payment processing options for a given merchant. For example, a merchant may have a desktop computing device with the payment process application installed thereon, and the merchant may also have some sort of payment hardware such as a card reading device, POS terminal, etc. In these examples, the merchant may select, as an option, the payment hardware to complete the transaction as if the transaction had started at the payment hardware. The payment hardware may receive the transaction data from the application and may communicate with the payment processing service to complete the transaction.

Figure 6:
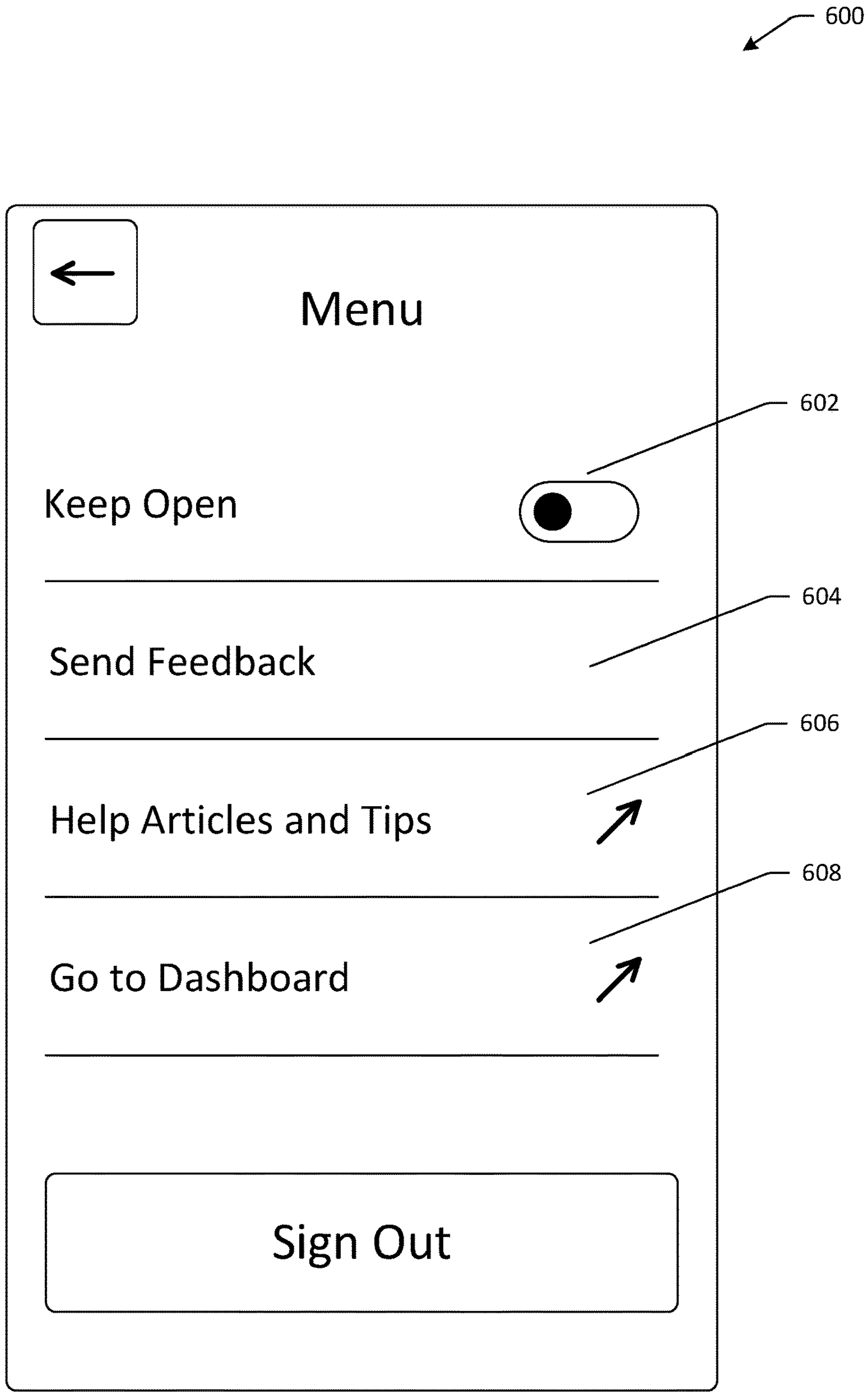
FIG. 6 is an example user interface where functionality options may be presented in association with a payment processing application.

FIG. 6 is an example user interface 600 where functionality options may be presented in association with a payment processing application. The payment processing application as described in FIG. 6 may be the same or similar to the payment processing application 122 described with respect to FIG. 1.

As shown in FIG. 6, a merchant may enable a "keep open" option 602 for the application that "pins" the application to a foreground of the computing device regardless of other applications that are being currently utilized. This may enable the merchant to highlight and select data from other applications and when a shortcut is utilized as outlined herein the data input to the payment processing application may be visualized in real time.

Other options may include a send feedback option 604 for enabling the merchant to send feedback on use of the payment processing application. This feedback data may be utilized to train one or more machine learning models as described in more detail elsewhere herein. The options may also include a help option 606 to provide a merchant with instruction and tips for utilizing the payment processing application. The options may also include a dashboard link 608 to go to a dashboard portion of the payment processing application.

Figure 7:
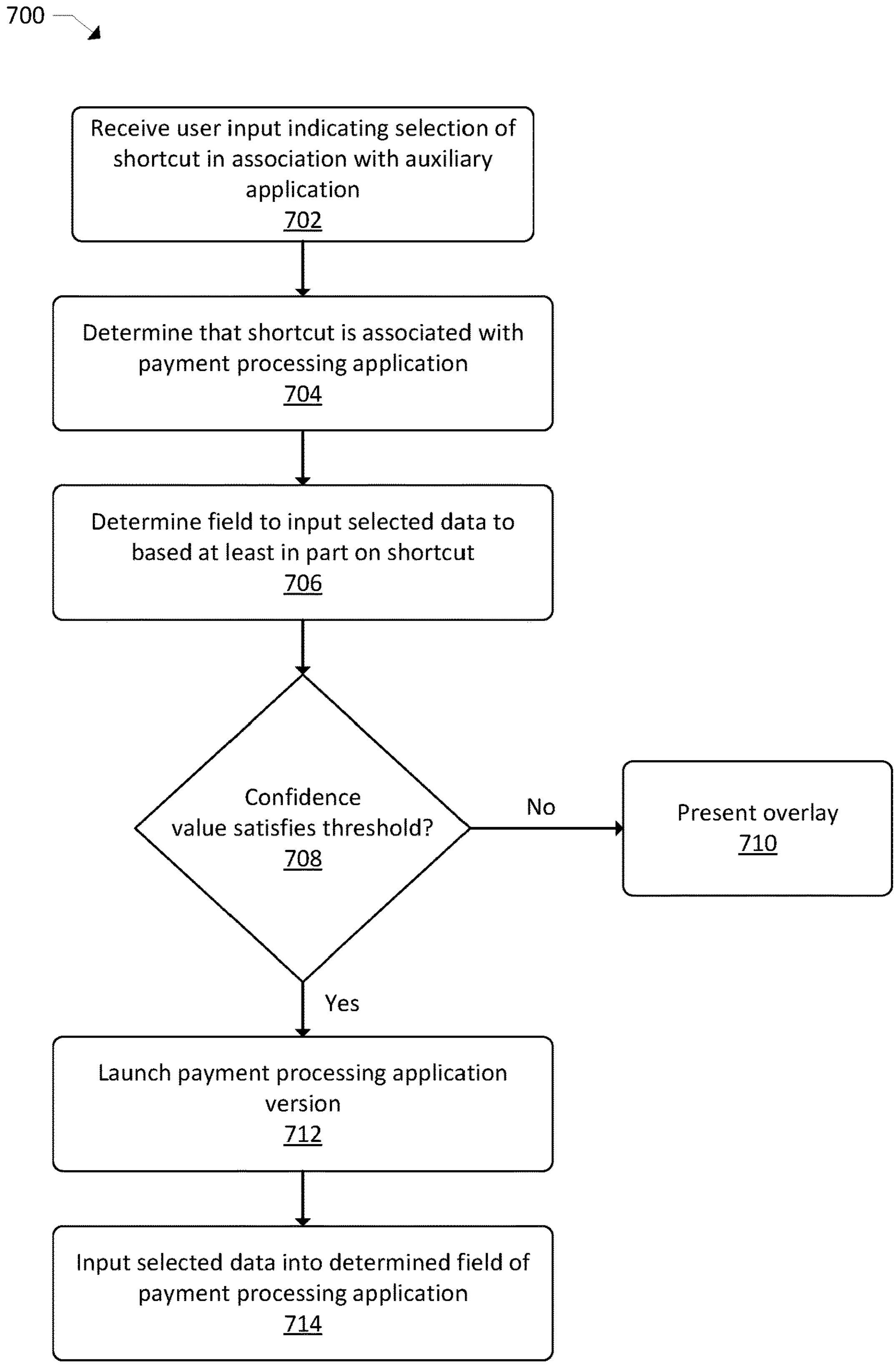
FIG. 7 is a flow diagram of an example process for utilizing shortcuts to integrate a payment processing application with one or more other applications residing on a computing device.
Figure 8:
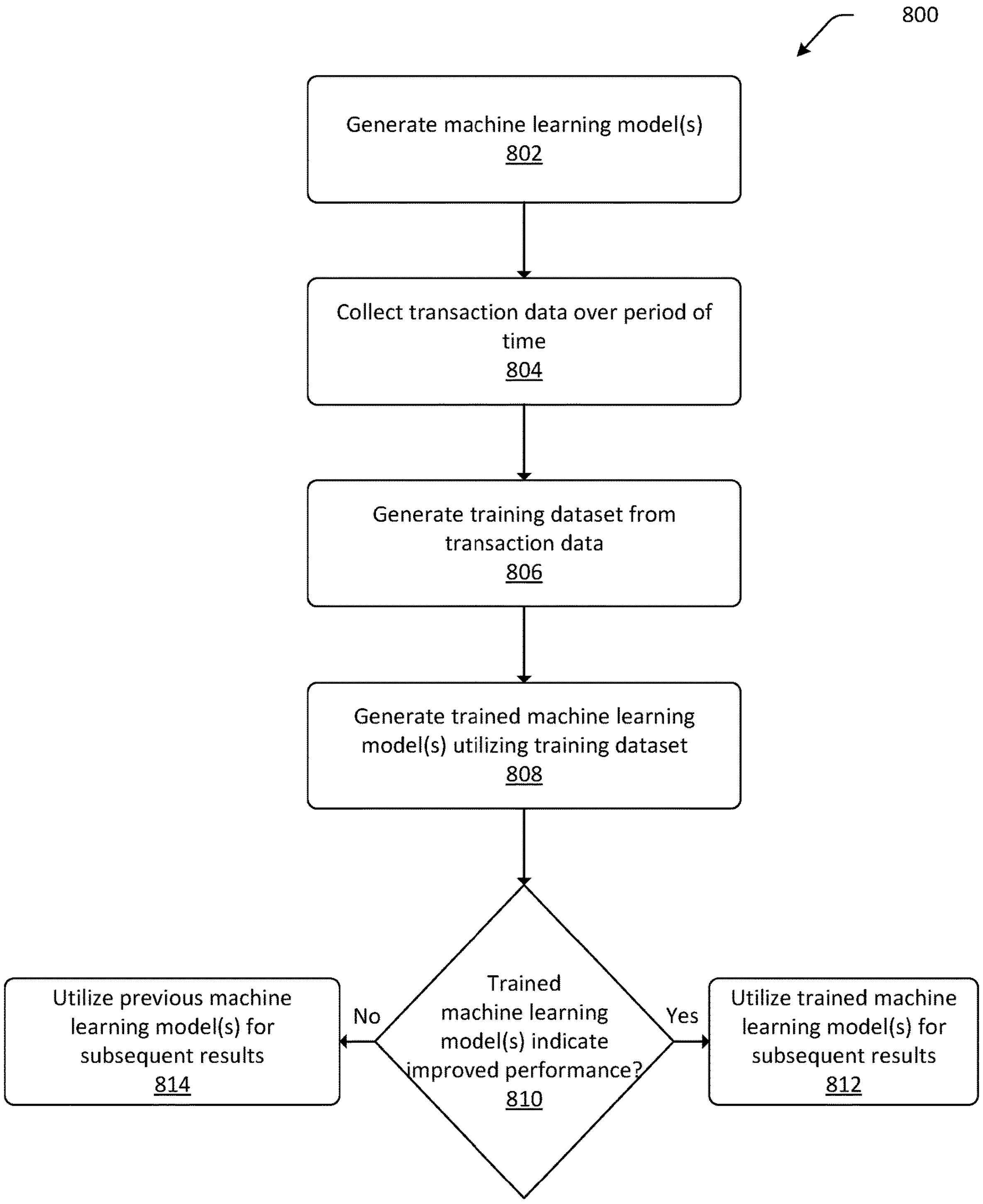
FIG. 8 is a flow diagram of an example process for the generation, training, and use of machine learning models associated with dynamic cross-application functionality.

FIGS. 7 and 8 are example processes for dynamic cross-application functionality. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 9-13, although the processes may be implemented in a wide variety of other environments, architectures and systems.

FIG. 7 is a flow diagram of an example process 700 for utilizing shortcuts to integrate a payment processing application with one or more other applications residing on a computing device. The order in which the operations or steps are described is not intended to be construed as a limitation, and any number of the described operations may be combined in any order and/or in parallel to implement process 700.

At block 702, the process 700 may include receiving user input indicating selection of a shortcut in association with an auxiliary application. For example, a payment processing application may be configured to integrate with other applications associated with the merchant. For example, the computing device at issue may include a litany of other applications that, at least in part, may be relevant to functionality associated with the payment processing application. By way of example, the computing device may include a loyalty application that tracks customer loyalty data, an inventory application that tracks inventory data associated with the merchant, a card-on-file application that stores payment instrument information associated with customers, a customer application that generates and stores historical data associated with past transactions with customers, a spreadsheet application that allows users to input values into cells of a spreadsheet, web browsing applications, customer service applications, chat or other communication-related applications, etc. While each of these example applications has its own functionality, at least a portion of that functionality may be relevant to payment processing as performed by the payment processing application. For example, the loyalty application may store a loyalty identifier, points data, discount data, etc. associated with a given customer. To utilize the data from the loyalty application, a user of the computing device, absent the innovations described herein, would launch the loyalty application, find the appropriate loyalty data for the customer at issue, remember the data while launching a payment processing application, start a transaction, and then manually type in the loyalty data into an appropriate field of the payment processing application to associate the loyalty data with the transaction at issue. This process is time consuming, error prone, and requires the merchant to manage multiple applications at the same time.

To alleviate these and other computer-centric concerns associated with application management on computing devices, the present disclosure describes the ability to integrate a payment processing application with other applications on a computing device such that a merchant may extract and utilize selected data from any of these applications through the use of a shortcut that, when executed, may cause the payment processing application to launch and the selected data to be prefilled in the appropriate field associated with a transaction. Take for example a spreadsheet application, where a merchant may have prepopulated cells of the spreadsheet with information such as a identifiers of goods or services offered by the merchant, costs for those goods or services, discount codes, inventory quantities, etc. Utilizing the functionality described herein, the merchant may highlight or otherwise select a portion of this information for inclusion in a transaction and the user may provide user input corresponding to a predefined shortcut associated with the payment processing application.

At block 704, the process 700 may include determining that the shortcut is associated with a payment processing application. For example, shortcuts for a given application may be configured to cause an action to be performed for that application and not necessarily the payment processing application. For example, a word processing application, the shortcut of Ctrl+C may cause a copy functionality of the word processing application to be utilized. In other implementations, given shortcuts may be associated with inputting selected data in the payment processing application.

At block 706, the process 700 may include determining a field to input selected data from the auxiliary application based at least in part on the shortcut that was utilized by the merchant. For example, when the predefined shortcut input is provided, the computing device may cause the payment processing application to launch (if not already launched), and may cause the selected data from the spreadsheet application to be entered into a field of the payment processing application that corresponds to a data type of the selected data. For example, if the selected data was a description of a to-be-purchased good, the description may be automatically input into a description field in the payment processing application. In some implementations, if the selected data was a price for the good, the price may be automatically input into a price field in the payment processing application. The merchant may perform the same or a similar process with respect to other applications on the computing device, such as selecting loyalty data for the customer at issue and providing a shortcut input that causes the loyalty data to be input into a loyalty-related field in the payment processing application. By so doing, the merchant may provide a predefined shortcut input when an application is in a foreground of the computing device at issue to cause the payment processing application to launch and the selected data to be automatically entered into appropriate fields in the payment processing application.

To do so, in an example, a single predefined shortcut may be associated with the payment processing application, such as (in a non-limiting example) selection of Ctrl+Shift+B on a keyboard concurrently. In this example, the payment processing application may launch and may cause the selected data to be sent from the application being utilized to the payment processing application. The payment processing application may analyze the received data or metadata associated therewith to determine a data type that the data is associated with. For example, when the selected data includes text such as words the text may be analyzed to determine that the data is a description of goods or services. When the selected data includes numbers, the numbers may be analyzed to determine that the data is a price for the goods or services. In examples, the metadata may include an identifier of the application from which the data was received, which may inform the determination of the data type at issue. For example, if the metadata indicates that the application at issue is a loyalty application, that metadata may indicate that the received data is associated with a loyalty field of the payment processing application. In certain examples, particularly where determination of the appropriate field to enter the selected data is not associated with a high degree of confidence, the payment processing application may display a user interface that includes possible fields for the data to be entered into and may present an overlay or other selection visualization that identifies the multiple potential fields that the selected data may be entered into along with a keyboard key for each field that, when selected, indicates the merchant's intent to choose that field for data input. For example, selected data from a spreadsheet application may include text. The payment processing application may determine that the appropriate field for entry of the selected data could be the field related to description of goods or the field associated with an address of a customer. In this example, the user interface may display the goods description field and the customer address field along with an overlay with, for example, the number "1" displayed over or near the goods description field and the number "2" displayed over or near the customer address field. The merchant may then select the appropriate key on the keyboard of the computing device to cause the selected data to be input into the appropriate field. It should be understood that when an input field is selected, a confidence value or other measure of certainty that the input field is the correct field may be determined and may be compared to a threshold confidence value. If the determined confidence value satisfies the threshold confidence value, the selected data may be input into the selected input field. If not, as described above, the overlay of options may be presented, in examples.

In some implementations, many shortcuts may be provided and each of the shortcuts may be associated with a given field or set of fields in the payment processing application. For example, a first shortcut may cause the payment processing application to receive selected data and to input that selected data into a given field associated with the first shortcut, such as a price field. Use of a second shortcut may cause selected data to be input into a description of goods field. Other shortcuts may be associated with other fields as described herein. By so doing, a handful of shortcuts may be provided to merchants to allow those merchants to, using a single input, launch the payment processing application and have selected data input into one or more fields of the payment processing application.

In some implementations, machine learning techniques may be employed to determine how to process a given shortcut input. For example, a machine learning model may be generated that is configured to determine which field of the payment processing application to input selected data in based at least in part on available data associated with the user input, the selected data, and the application from which the data was selected. A training dataset may be generated that indicates user inputs, selected data, application details, and results data indicating whether a selected field was properly selected. The machine learning model may be trained utilizing the training dataset to generate a trained machine learning model that may be utilized to select an input field when shortcut input is received.

At block 708, the process 700 may include determining whether a confidence value associated with determining the field of the payment processing application satisfies a threshold confidence value. For example, in certain of the examples provided above where a given shortcut is not statically assigned to a specific field in the payment processing application, determination of the field may be made and a confidence value for that determination may be generated.

In examples where the confidence value does not satisfy the threshold confidence value, the process 700 may include, at block 710, presenting an overlay with representations of keyboard keys on a user interface associated with the payment processing application. The overlay or otherwise keyboard indicators displayed on the user interface of the payment processing application may provide the merchant with a visualization of the options for input of the selected data and may require only a simple selection of one of the keys on the keyboard to cause input of the selected data in that field.

In examples where the confidence value satisfies the threshold confidence value, the process 700 may include, at block 712, launching the payment processing application or a version of the payment processing application. For example, certain shortcuts or selected data may be utilized to process a transaction and thus a full version of the payment processing application may be launched and utilized. However, in some implementations, certain shortcuts or selected data may be utilized to provide non-transaction related functionality associated with the payment processing application, such as for tax purposes, for accounting purposes, for logging loyalty information, for contacting customers, etc. In these examples, depending on the shortcut utilized or the selected data, receipt of input associated with the shortcut may cause a portion of the payment processing application or a version thereof to launch and be utilized.

At block 714, the process 700 may include inputting the selected data into the determined field of the payment processing application. Inputting the selected data may cause the field at issue of the payment processing application to be filled in the selected data.

FIG. 8 is a flow diagram of an example process 800 for the generation, training, and use of machine learning models associated with dynamic cross-application functionality. The order in which the operations or steps are described is not intended to be construed as a limitation, and any number of the described operations may be combined in any order and/or in parallel to implement process 800. The operations described with respect to FIG. 8 may be performed by the payment processing service 104, in examples.

At block 802, the process 800 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore (s) 132, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 804, the process 800 may include collecting transaction data over a period of time. The transaction data may include any of the data described with respect to the datastore(s) 132, any data associated with the use of the payment processing applications described herein, any data associated with shortcut use, any data described with respect to FIGS. 1-7 and 9-13, or any other data that may be utilized to perform the operations described herein. This information may include factors associated with the shortcuts described herein, such as user feedback, interactions with the payment processing application, interactions with the other applications, etc. It should be understood that this training data may include data associated with users other than the merchant at issue or a given customer. As such the training data may include any information associated with a given merchant or a set of merchants that is available to the payment processing service described herein. For example, a machine learning model may be trained such that a merchant type is an input into the machine learning model, with different models being utilized for different merchant types, different merchant tiers, etc.

At block 806, the process 800 may include generating a training dataset from the transaction data. Generation of the training dataset may include formatting the transaction data, feedback data, etc. into input vectors for the machine learning model to intake, as well as associating the various data with the outcomes of shortcut usage to seamlessly share data between applications.

At block 808, the process 800 may include generating one or more trained machine learning models utilizing the training dataset. Generation of the trained machine learning models may include updating parameters and/or weightings and/or thresholds utilized by the models to generate recommendations, user preferences, shortcuts, or to determine what field to input selected data to for a given shortcut input etc. based at least in part on the data from the training dataset. The trained machine learning models may differ from the original machine learning models in that certain additional or different factors may be utilized by the trained machine learning models, certain weighting of factors may be different than those utilized by the original machine learning models, etc.

At block 810, the process 800 may include determining whether the trained machine learning models indicate improved performance metrics. For example, a testing group may be generated where the outcomes of the keyboard short data placement processes are known but not to the trained machine learning models. The trained machine learning models may generate results, which may be compared to the known results to determine whether the results of the trained machine learning model produce a superior result than the results of the machine learning model prior to training. For example, performance metrics associated with the accurate selection of input fields for inputting selected data using the shortcuts described herein may be determined and compared as between the original machine learning models and the trained machine learning models. Additionally, performance metrics associated with how and when interactive links are sent to customer to complete a transaction initiated on the payment processing application may be determined and compared as between the original machine learning models and the trained machine learning models.

In examples where the trained machine learning models indicate improved performance metrics, the process 800 may include, at block 812, utilizing the trained machine learning models for generating subsequent results. For example, the trained machine learning models may be utilized to determine fields of the payment processing application to input selected data given the data at issue, the application from which the data was received, or information associated with the merchant or the customer. Additionally, the trained machine learning models may be utilized to adjust or recommend adjusting user preferences or condition thresholds as described herein. It should be understood that the trained machine learning models may be utilized in any scenario where models are utilized as described herein.

In examples where the trained machine learning models do not indicate improved performance metrics, the process 800 may include, at block 814, utilizing the previous iteration of the machine learning models for generating subsequent results.

Figure 9:
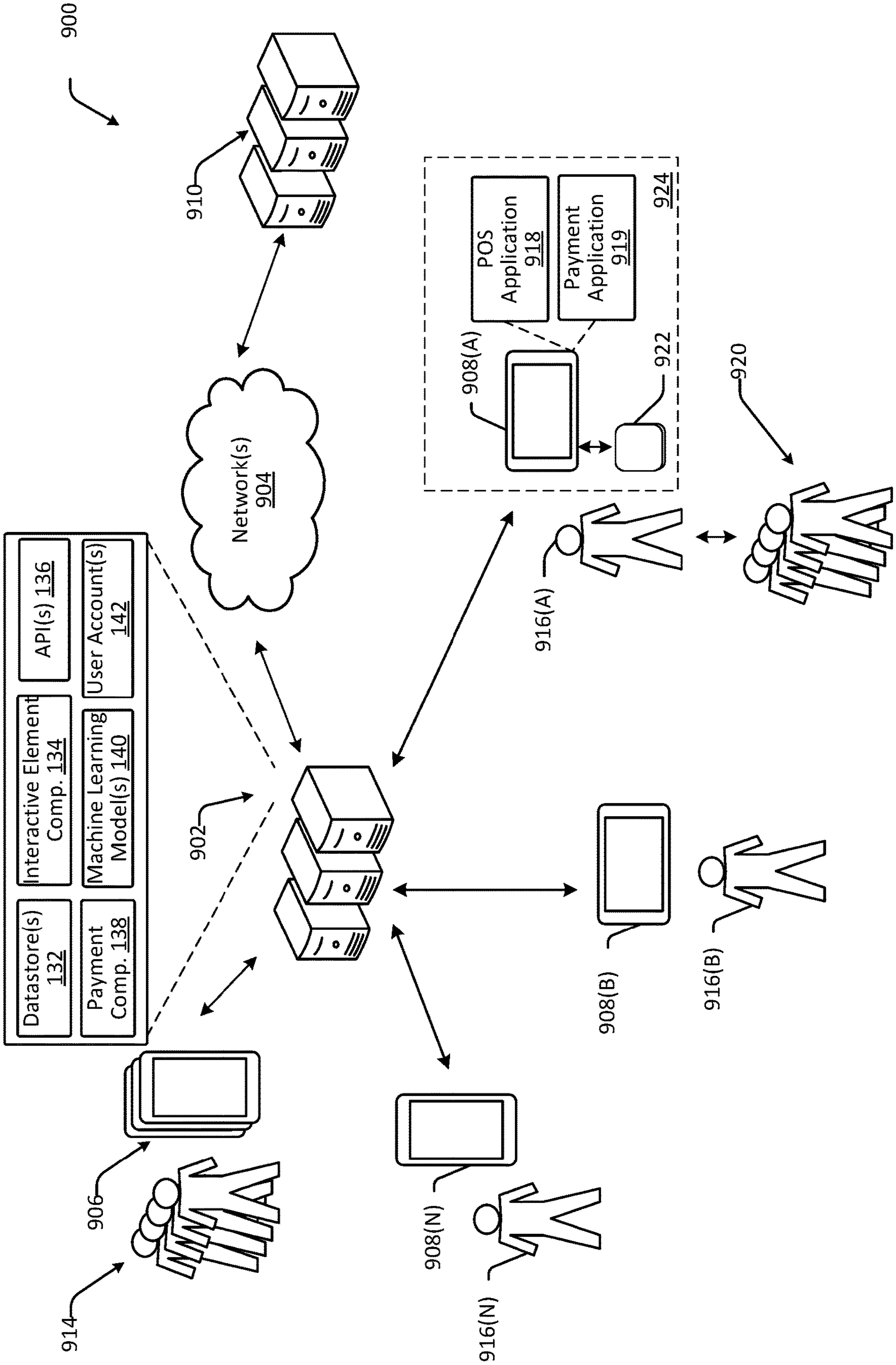
FIG. 9 is an example environment with user devices, merchant devices, a payment service, and/or other systems that may be involved in a transaction, such as by utilizing the payment application as configured herein, according to an embodiment described herein.

FIG. 9 is an example environment with user devices, merchant devices, a payment service, and/or other systems that may be involved in a transaction, such as by utilizing the payment application as configured herein, according to an embodiment described herein. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902. In examples, the server(s) 902 may be the same as or similar to the payment processing service 104 from FIG. 1, which may include the same or similar components as described with respect to the payment processing service 104 of FIG. 1. At least some of those components may include one or more datastores 132, an interactive element component 134, one or more APIs 136, a payment component 138, one or more machine learning models 140, and one or more user accounts 142.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In some implementations, a user interface can be presented via an application, such as a mobile application or application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)). In an example, the merchants 916 can operate respective merchant devices 908, which can be user devices 906 configured for use by merchants 916. For the purpose of this discussion, a "merchant" can be any entity that offers items (e.g., goods or services) for purchase or other means of acquisition (e.g., rent, borrow, barter, etc.). The merchants 916 can offer items for purchase or other means of acquisition via brick-and-mortar stores, mobile stores (e.g., pop-up shops, food trucks, etc.), online stores, combinations of the foregoing, and so forth. In some examples, at least some of the merchants 916 can be associated with a same entity but can have different merchant locations and/or can have franchise/franchisee relationships. In additional or alternative examples, the merchants 916 can be different merchants. That is, in at least one example, the merchant 916(A) is a different merchant than the merchant 916(B) and/or the merchant 916(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the customers 920 and the merchants 916 that involve the exchange of funds (from the customers 920) for items (from the merchants 916) can be referred to as "transactions." In at least one example, the POS application 918 can determine transaction data associated with the POS transactions. Transaction data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transactions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Bluetooth® BLE, and so on. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server(s) 902, which can provide, among other services, a payment processing service. The server(s) 902 associated with the service provider can communicate with server(s) 910, as described below. In this manner, the POS terminal and reader device 922 may collectively process transaction(s) between the merchants 916 and customers 920. In some examples, POS terminals and reader devices can be configured in one-to-one pairings. In some implementations, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In some implementations, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®), VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits its funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 916(A) has available for acquisition. The service provider can offer recommendations related to pricing of the items, placement of items on the catalog, and multi-party fulfilment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products.

For example, in one implementation, the server provider 912 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s) 902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with one or more server computing devices 902 of the service provider. That is, techniques described herein are directed to a specific implementation—or, a practical application—of utilizing a distributed system of user devices 906 that are in communication with one or more server computing devices 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
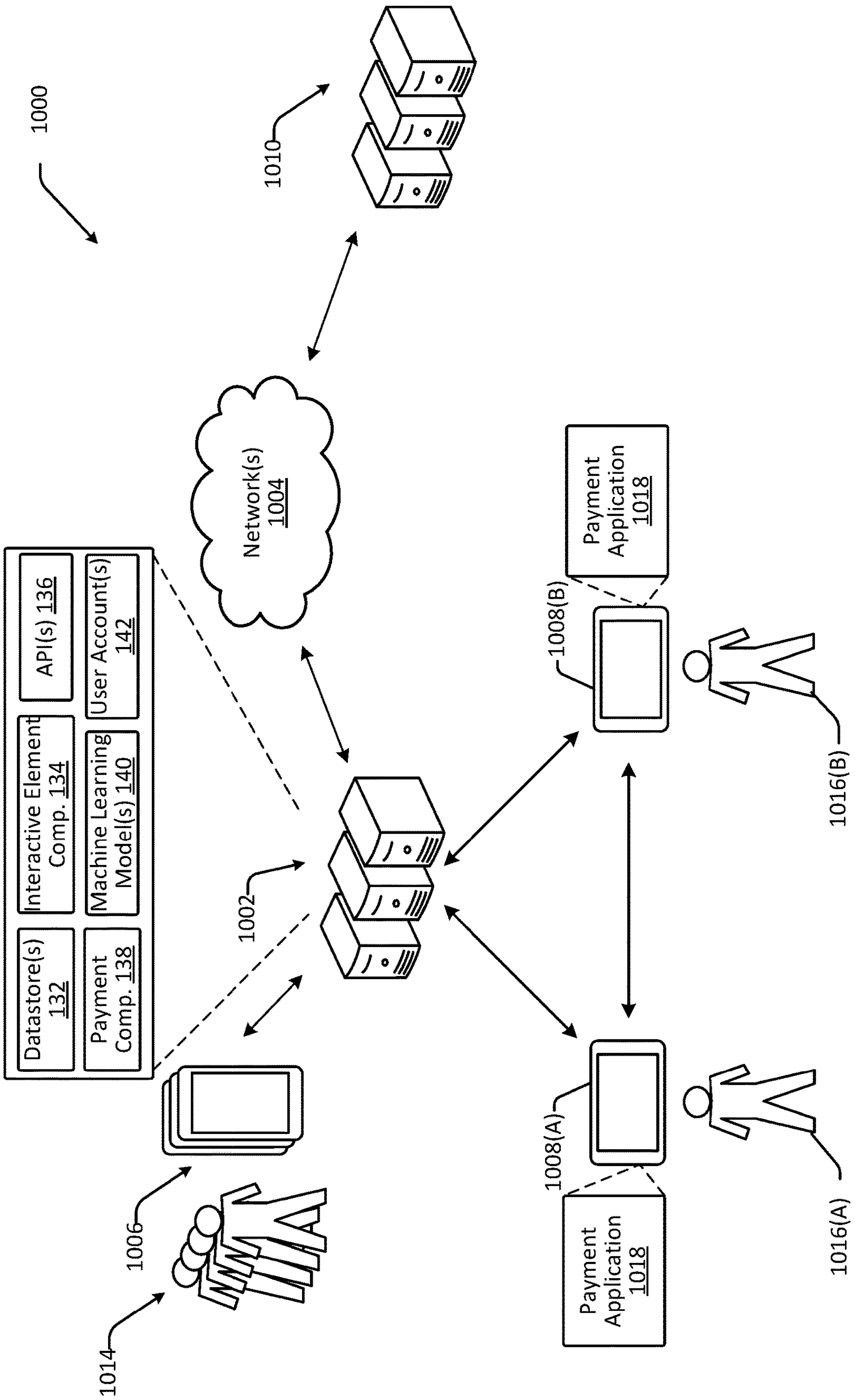
FIG. 10 is an example environment illustrating usage of the payment application, such as described herein, according to an embodiment described herein.

FIG. 10 is an example environment illustrating usage of the payment application, according to an embodiment described herein. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s)

1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10. As described herein, the server(s) 1002 may be the same or similar to the payment processing service 104 described with respect to FIG. 1, which may include the same or similar components as described with respect to the payment processing service 104 of FIG. 1. At least some of the components may include one or more datastores 132, an interactive element component 134, one or more APIs 136, a payment component 138, one or more machine learning models 140, and one or more user accounts 142.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 11:
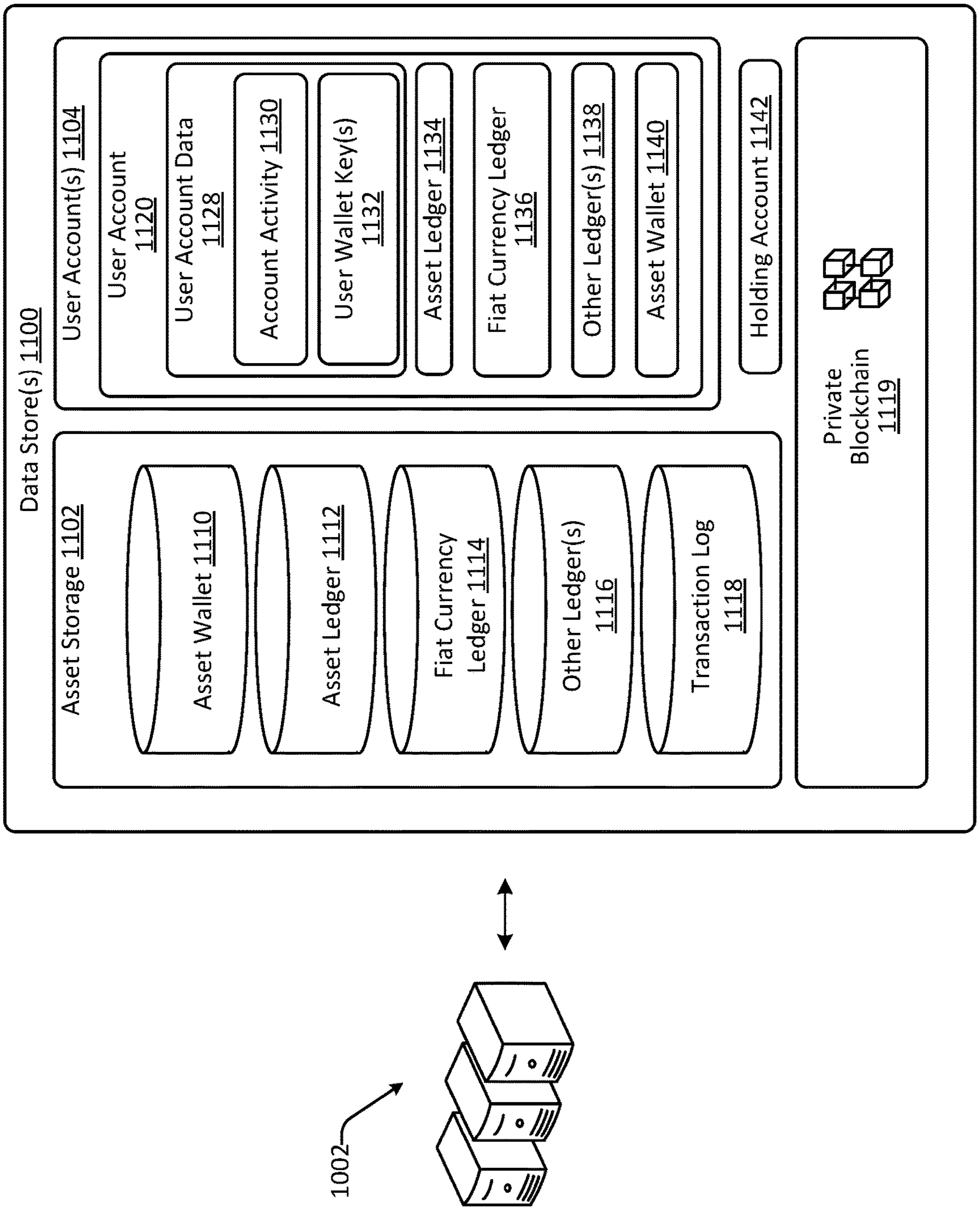
FIG. 11 is an example of datastore(s) that can be associated with servers of the payment service, according to an embodiment described herein.

In some examples, the service provider can utilize a ledger system to track transfers of assets between users 1006. FIG. 11, below, provides additional details associated with such a ledger system. The ledger system can enable users 1006 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1006 to transfer fiat currency, non-fiat currency, cryptocurrency, securities, or other assets, or portions thereof, to other users 1006. In at least one example, individual users can be associated with user accounts. Additional details associated with user accounts and the transfer of assets between users 1006 are described below with reference to FIG. 11.

Furthermore, the service provider can enable users 1006 to perform banking transactions via instances of the payment application 1018. For example, users can configure direct deposits or other deposits for adding assets to their various ledgers/balances. Further, users 1006 can configure bill pay, recurring payments, and/or the like using assets associated with their accounts. In addition to sending and/or receiving assets via peer-to-peer transactions, users 1006 buy and/or sell assets via asset networks such as cryptocurrency networks, securities networks, and/or the like.

FIG. 11 is an example of data store(s) that can be associated with servers of the payment service, according to an embodiment described herein. In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider. In at least one example, the asset storage 1102 can be used to record whether individual of the assets are registered to users. For example, the asset storage 1102 can include an asset wallet 1110 for storing records of assets owned by the service provider, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

The asset wallet 1110 can be associated with one or more addresses and can vary addresses used to acquire assets (e.g., from the asset network(s)) so that its holdings are represented under a variety of addresses on the asset network. In examples where the service provider has its own holdings of cryptocurrency (e.g., in the asset wallet 1110), a user can acquire cryptocurrency directly from the service provider. In some examples, the service provider can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1006. Specifically, the asset storage 1102 may include asset ledger 1110, fiat currency ledger 1114, and other ledger(s) 1116, which can be used to record transfers of assets between users 1006 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider can record transactions taking place within the service provider involving cryptocurrency until the number of transactions has exceeded a determined limit (e.g., number of transactions, storage space allocation, etc.). Based at least in part on determining that the limit has been reached, the service provider can publish the transactions in the private blockchain 1119 to a public blockchain (e.g., associated with the asset network), where miners can verify the transactions and record the transactions to blocks on the public blockchain. In at least one example, the service provider can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 1006. In at least one example, the user account(s) 1104 can include a user account 1120, which can be associated with a user (of the users 1006). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider, for the user. For example, the user account 1120 may include an asset ledger 1134, a fiat currency ledger 1136, and/or one or more other ledgers 1138. The ledger(s) can indicate that a corresponding user utilizes the service provider to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1 132. In some examples, the user wallet key(s) 1132 may be generated for the user upon request. User wallet key(s) 1132 can be requested by the user in order to send, exchange, or otherwise control the balance of cryptocurrency held by the service provider (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider and the value is credited as a balance in asset ledger 1134), by purchasing currency in the form associated with the account using currency in a different form (e.g., buying a value of cryptocurrency from the service provider using a value of fiat currency reflected in fiat currency ledger 1114, and crediting the value of cryptocurrency in asset ledger 1134), or by conducting a transaction with another user (customer or merchant) of the service provider wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, in some embodiments, the service provider can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider (i.e., an external account). In at least one example, the user can transfer all or a portion of a balance of the cryptocurrency stored in the third-party cryptocurrency wallet to the service provider. Such a transaction can require the user to transfer an amount of the cryptocurrency in a message signed by user's private key to an address provided by the service provider. In at least one example, the transaction can be sent to miners to bundle the transaction into a block of transactions and to verify the authenticity of the transactions in the block. Once a miner has verified the block, the block is written to a public, distributed blockchain where the service provider can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider. As described above, in some examples, the service provider can acquire cryptocurrency from a third-party source (e.g., associated with the third-party server(s)). In such examples, the asset wallet 1110 can be associated with different addresses and can vary addresses used to acquire cryptocurrency so that its holdings are represented under a variety of addresses on a blockchain. When the service provider has their own holdings of cryptocurrency, users can acquire cryptocurrency directly from the service provider. In some examples, the service provider can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider can credit the asset ledger 1134 of the user. Additionally, while the service provider recognizes that the user retains the value of the transferred cryptocurrency through crediting the asset ledger 1134, any person that inspects the blockchain will see the cryptocurrency as having been transferred to the service provider. In some examples, the asset wallet 810 can be associated with many different addresses. In such examples, any person that inspects the blockchain may not easily associate all cryptocurrency stored in asset wallet 810 as belonging to the same entity. It is this presence of a private ledger that is used for real-time transactions and maintained by the service provider, combined with updates to the public ledger at other times, that allows for extremely fast transactions using cryptocurrency to be achieved. In some examples, the "private ledger" can refer to the asset ledger 1110, which in some examples, can utilize the private blockchain 1119, as described herein. The "public ledger" can correspond to a public blockchain associated with the asset network.

In at least one example, a user's asset ledger 1134, fiat currency ledger 1836, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider and used to fund the asset ledger 1134 of the user.

As addressed above, in some examples, users can also have other accounts maintained by the service provider. For example, a user can also have an account in U.S. dollars, which can be tracked, for example, via the fiat currency ledger 1136. Such an account can be funded by transferring money from a bank account at a third-party bank to an account maintained by the service provider as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider. In at least one example, individual of the accounts can be associated with a wallet or a stored balance for use in payment transactions, peer-to-peer transactions, payroll payments, etc.

In at least one example, the user account 1120 can be associated with an asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1840 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider, the customer can send a message signed by its private key including its wallet address (i.e., of the customer) and identifying the cryptocurrency and value to be transferred to the merchant's asset wallet 1140. The service provider can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account 1130 can be funded by a balance transfer from a third-party cryptocurrency wallet, as described above. Such a transaction can require a user to transfer an amount of cryptocurrency in a message signed by the user's private key to an address of the cryptocurrency wallet account 1130. The transferred amount of cryptocurrency can then be within the cryptocurrency wallet account 1130 for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider is an aspect of the technology disclosed that enables technical advantages of increased processing speed and improved security.

Figure 12:
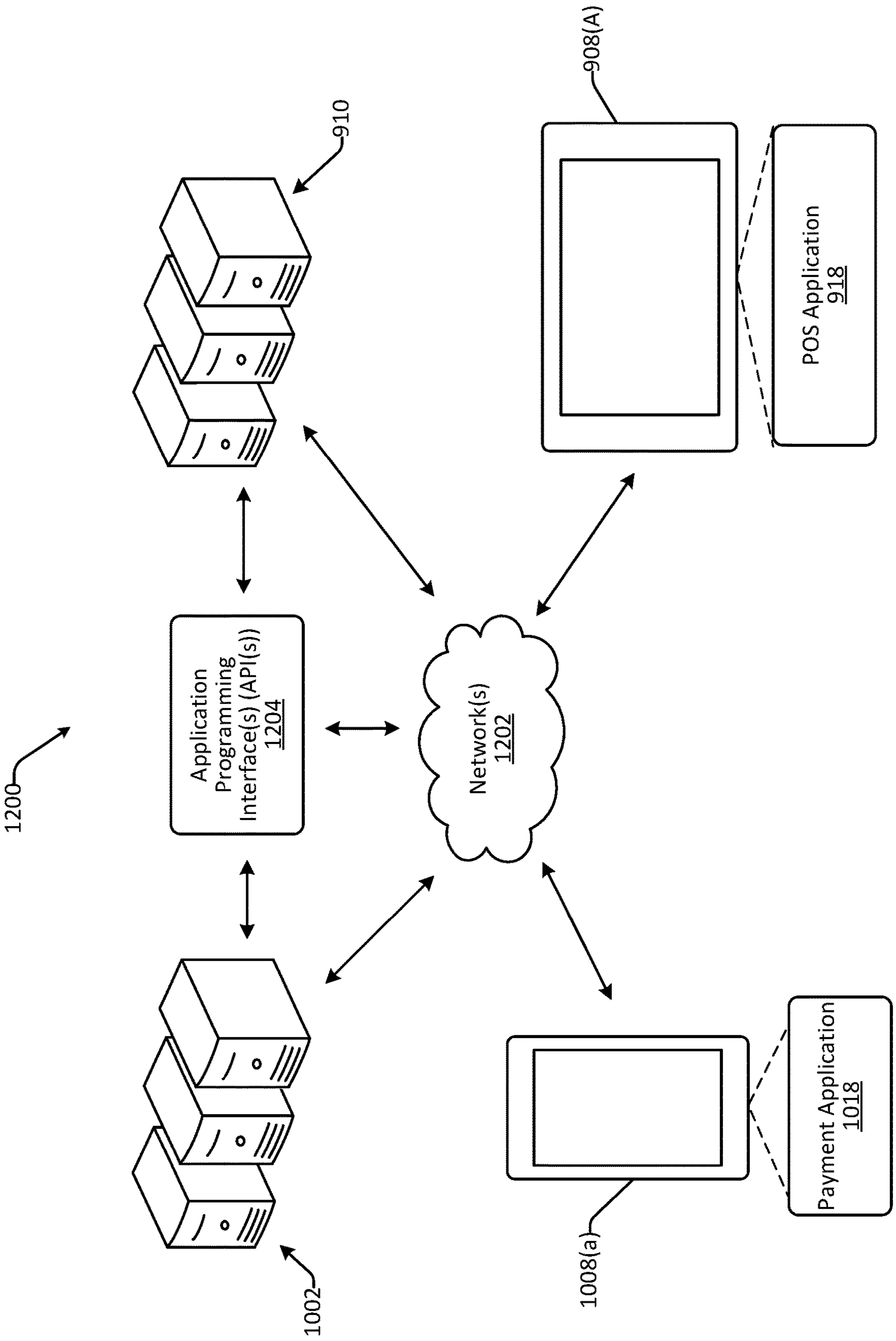
FIG. 12 is an example environment wherein the payment service environment of FIG. 9 can be integrated to enable payments at the point-of-sale using assets associated with user accounts in the peer-to-peer environment of FIG. 10, according to an embodiment described herein.

FIG. 12 is an example environment 1200 wherein the environment 1200 and the environment 1000 can be integrated to enable payments at the point-of-sale using assets associated with user accounts in the peer-to-peer environment of FIG. 10, according to an embodiment described herein. As illustrated, each of the components can communicate with one another via one or more networks 1202. In some examples, one or more APIs 1204 or other functional components can be used to facilitate such communication. For example, the APIs 1204 can be used to facilitate communication with payment service server(s) 1002 and server(s) 1010 associated with third-party service provider(s).

In at least one example, the example environment 1200 can enable contactless payments, via integration of peer-to-peer payment, or other payment making, platform(s) and payment processing platform(s), are described herein. For the purpose of FIG. 12, the environment 1200 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 1208(A). In such an example, the POS application 1218, associated with a payment processing platform and executable by the merchant device 1208(A) of the merchant, can present a Quick Response (QR) code, or other code that can be used to identify a transaction (e.g., a transaction code), in association with a transaction between the customer and the merchant. The QR code, or other transaction code, can be provided to the POS application 1218 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 1202 and/or server(s) 1002.

Based at least in part on the integration of the peer-to-peer payment platform and the payment processing platform (e.g., via the API), the server(s) 1202 and/or 1002 associated with each can exchange communications with each other—and with a payment application 1018 associated with the peer-to-peer payment platform and/or the POS application 1218—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1218 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1208(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1218 can cause a message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1218 of a merchant device 1208(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant—via the POS application 1218 on the merchant device 1208(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1218, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 13:
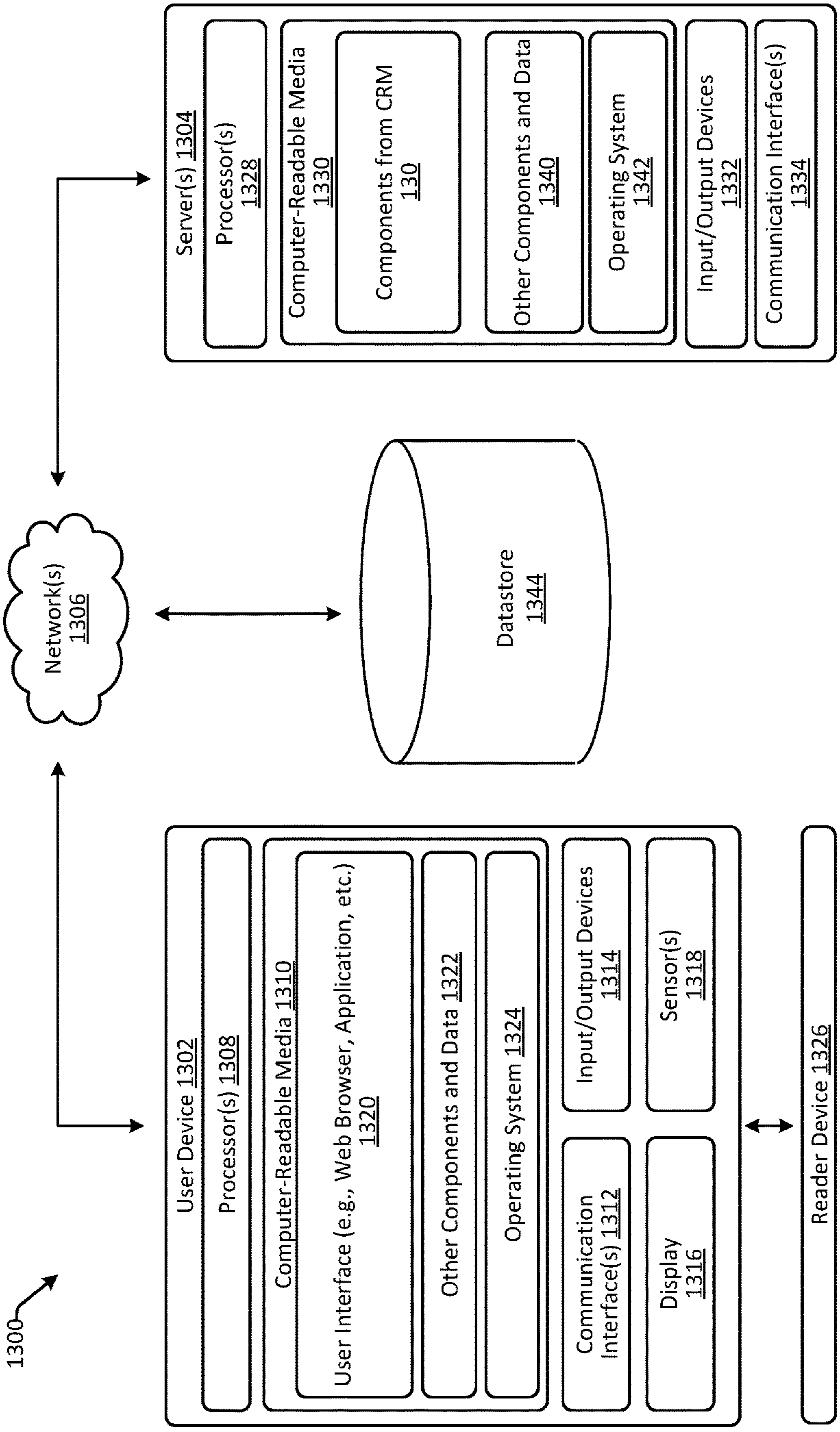
FIG. 13 is an illustrative block diagram illustrating a system for performing techniques described herein, according to an embodiment described herein.

FIG. 13 is an illustrative block diagram illustrating a system for performing techniques described herein, according to an embodiment described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 13. The user device 1302 may be the same or similar to the customer device 103 and/or the merchant device 102 as described with respect to FIG. 1. Additionally, the server(s) 1004 may be the same or similar to the payment processing service 104 described with respect to FIG. 1.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In at least one example, the user interface 1320 can be presented via a web browser, or the like. In other examples, the user interface 1320 can be presented via an application, such as a mobile application or application, which can be provided by a service provider associated with the server(s) 1304, or which can be an otherwise dedicated application. In some examples, the user interface 1320 can be configured to display options for withdrawing funds to make donations. The user interface 1320 may also be configured to surface information about donations. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, to determine context or intent of the user, which may be treated in a manner similar to "direct" user input.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O)) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1324, described above, to provide one or more services. That is, in some examples, the service provider 1324 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1314 and/or for sending users 1314 notifications regarding available appointments with merchant(s) located proximate to the users 1314. In at least one example, location can be used for taking payments from nearby customers when they leave a geofence, or location can be used to initiate an action responsive to users 1314 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the payment processing service 104 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1312, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider and/or payment processing service.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more other components and data can include programs, drivers, etc., and the data used or generated by the functional components. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304. The computer-readable media 1330 may include one or more other components and data 1340 such as those described with respect to FIG. 1. Additionally, the CRM 1330 may include any or all of the components from the CRM 130 described with respect to FIG. 1.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1302 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 1312.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 7 and 8 for convenience and ease of understanding. However, the methods illustrated are not limited to being performed using components described in FIGS. 1-6, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method, comprising:

receiving, at a primary processing application residing on a computing device of a merchant and executing in a background of the computing device, an indication that first user input data corresponding to selection of a shortcut predefined to be associated with an input field of the primary processing application has been received at an ancillary application executing in a foreground of the computing device, wherein the shortcut is a concurrent selection of two or more keys on an input device and indicates that the merchant has selected data from the ancillary application for automatic input to the input field of the primary processing application, and wherein each individual input field in a plurality of input fields of the primary processing application is associated with a unique predefined shortcut;

in response to receiving the indication, causing the primary processing application to execute in the foreground of the computing device and the ancillary application to execute in the background of the computing device; and inputting the selected data into the input field of the primary processing application.

2. The computer-implemented method of claim 1, further comprising:

determining one or more ancillary applications identified as being associated with the primary processing application, the one or more ancillary applications including the ancillary application; and sending, to the one or more ancillary applications, first data configured to cause the one or more ancillary applications to communicate with the primary processing application upon selection of the shortcut.

3. The computer-implemented method of claim 1, further comprising:

causing display, while the primary processing application is in the foreground of the computing device, of shortcut options, wherein the shortcut options indicate:

keyboard keys that, when selected, correspond to a particular shortcut;

ancillary applications associated with the shortcut options; or input field types associated with the shortcut options;

receiving second user input data indicating a selection of one or more of the shortcut options; and enabling the one or more of the shortcut options based at least in part on the second user input data.

4. The computer-implemented method of claim 1, further comprising:

determining, based at least in part on user preference data, that the primary processing application is to be maintained in the foreground of the computing device when the ancillary application is being utilized;

receiving an indication that the merchant has navigated away from the primary processing application and to the ancillary application; and causing, based at least in part on receiving the indication that the merchant has navigated away from the primary processing application, the primary processing application to be maintained in the foreground of the computing device, a first window of the primary processing application configured such that the first window of the primary processing application is viewable on the computing device concurrently with a second window of the ancillary application.

5. The computer-implemented method of claim 1, further comprising:

determining that an item input portion of a transaction has been completed utilizing the primary processing application;

determining that the selected data includes contact information associated with a customer for the transaction; and sending, based at least in part on the item input portion being completed and the selected data including the contact information, data corresponding to a selectable link to a customer device associated with the customer, the selectable link, when selected, enabling entry of information for a portion of the transaction.

6. The computer-implemented method of claim 1, further comprising:

receiving, over a period of time, user data from multiple users indicating input fields where input is provided from ancillary applications; and generating association data indicating:

shortcuts;

the ancillary applications associated with the shortcuts; and the input fields associated with the shortcuts.

7. The computer-implemented method of claim 1, further comprising:

receiving additional selected data from at least one of the ancillary application or another ancillary application associated with the computing device;

inputting the additional selected data into additional input fields, wherein the input field and the additional input fields are associated with a payment to satisfy a cost of a transaction;

determining that fields for facilitating the transaction are filled based at least in part on the selected data being input into the input field and the additional selected data being input into the additional input fields; and facilitating the transaction utilizing the primary processing application.

8. A system, comprising:

one or more processors; and non-transitory computer-readable media storing instructions that, when executed by the one or more processors, cause the one or more processors to perform operations comprising:

receiving, at a primary processing application residing on a computing device, an indication that first user input data corresponding to selection of a shortcut predefined to be associated with an input field of the primary processing application has been received at an ancillary application executing in a foreground of the computing device, wherein the primary processing application is executing in a background of the computing device, and wherein the shortcut is a concurrent selection of two or more keys on an input device and indicates that a user has selected data from the ancillary application for automatic input to the input field of the primary processing application, and wherein each individual input field in a plurality of input fields of the primary processing application is associated with a unique predefined shortcut;

in response to receiving the indication, causing the primary processing application to execute in the foreground of the computing device and the ancillary application to execute in the background of the computing device;

and inputting the selected data into the input field of the primary processing application.

9. The system of claim 8, the operations further comprising:

receiving additional selected data from at least one of the ancillary application or another ancillary application associated with the computing device;

inputting the additional selected data into additional input fields, wherein the input field and the additional input fields are associated with a payment to satisfy a cost of a transaction;

determining that fields required for facilitating the transaction are filled based at least in part on the selected data being input into the input field and the additional selected data being input into the additional input fields; and facilitating the transaction utilizing the primary processing application.

10. The system of claim 8, the operations further comprising:

determining processing options available to a merchant associated with the primary processing application;

displaying, via a user interface associated with the primary processing application, the processing options for a transaction;

displaying an overlay on the processing options, the overlay including keyboard key indicators, individual ones of the keyboard key indicators associated with a processing option of the processing options;

receiving second user input data indicating selection of a keyboard key corresponding to a keyboard key indicator of the keyboard key indicators; and selecting the processing option associated with the keyboard key indicator.

11. The system of claim 8, the operations further comprising:

determining hardware components associated with the computing device, the hardware components providing capabilities to acquire information for a transaction;

determining processing options for the transaction based at least in part on the hardware components associated with the computing device; and displaying, via a user interface associated with the primary processing application, the processing options.

12. The system of claim 8, the operations further comprising:

determining hardware components associated with the computing device that are configured for providing a receipt to a customer for a transaction performed using the primary processing application;

determining, from attributes of the transaction, whether the customer is located in a location associated with the computing device;

determining receipt options based at least in part on the hardware components and whether the customer is located in the location; and displaying, via a user interface associated with the primary processing application, the receipt options.

13. The system of claim 8, the operations further comprising:

determining that input sufficient to complete an item input portion of a transaction has been received by the primary processing application;

displaying, via a user interface associated with the primary processing application, an option to send a selectable link to a customer device of a customer engaged in the transaction; and based at least in part on receiving second user input data indicating selection of the option, causing data corresponding to the selectable link to be sent to the customer device, the selectable link configured to display functionality on the customer device for receiving information for a portion of the transaction.

14. One or more non-transitory computer-readable media storing instructions executable by one or more processors that, when executed by the one or more processors, cause the one or more processors to perform operations comprising:

receiving, at a primary processing application residing on a computing device of a merchant and executing in a background of the computing device, an indication that first user input data corresponding to selection of a shortcut predefined to be associated with an input field of the primary processing application has been received at an ancillary application executing in a foreground of the computing device, wherein the shortcut is a concurrent selection of two or more keys on an input device and indicates that the merchant has selected data from the ancillary application for automatic input to the input field of the primary processing application, and wherein each individual input field in a plurality of input fields of the primary processing application is associated with a unique predefined shortcut;

in response to receiving the indication, causing the primary processing application to execute in the foreground of the computing device and the ancillary application to execute in the background of the computing device; and inputting the selected data into the input field of the primary processing application.

15. The one or more non-transitory computer-readable media as claim 14 recites, the operations further comprising:

determining one or more ancillary applications identified as being associated with the primary processing application, the one or more ancillary applications including the ancillary application; and sending, to the one or more ancillary applications, first data configured to cause the one or more ancillary applications to communicate with the primary processing application upon selection of the shortcut.

16. The one or more non-transitory computer-readable media as claim 14 recites, the operations further comprising:

causing display, while the primary processing application is in the foreground of the computing device, of shortcut options, wherein the shortcut options indicate:

keyboard keys that, when selected, correspond to a particular shortcut;

ancillary applications associated with the shortcut options; or input field types associated with the shortcut options;

receiving second user input data indicating a selection of one or more of the shortcut options; and enabling the one or more of the shortcut options based at least in part on the second user input data.

17. The one or more non-transitory computer-readable media as claim 14 recites, the operations further comprising:

determining, based at least in part on user preference data, that the primary processing application is to be maintained in the foreground of the computing device when the ancillary application is being utilized;

receiving an indication that the merchant has navigated away from the primary processing application and to the ancillary application; and causing, based at least in part on receiving the indication that the merchant has navigated away from the primary processing application, the primary processing application to be maintained in the foreground of the computing device, a first window of the primary processing application configured such that the first window of the primary processing application is viewable on the computing device concurrently with a second window of the ancillary application.

18. The one or more non-transitory computer-readable media as claim 14 recites, the operations further comprising:

determining that an item input portion of a transaction has been completed utilizing the primary processing application;

determining that the selected data includes contact information associated with a customer for the transaction; and sending, based at least in part on the item input portion being completed and the selected data including the contact information, data corresponding to a selectable link to a customer device associated with the customer, the selectable link, when selected, enabling entry of information for a portion of the transaction.

19. The one or more non-transitory computer-readable media as claim 14 recites, the operations further comprising:

receiving, over a period of time, user data from multiple users indicating input fields where input is provided from ancillary applications; and generating association data indicating:

shortcuts;

the ancillary applications associated with the shortcuts; and the input fields associated with the shortcuts.

20. The one or more non-transitory computer-readable media as claim 14 recites, the operations further comprising:

receiving additional selected data from at least one of the ancillary application or another ancillary application associated with the computing device;

inputting the additional selected data into additional input fields, wherein the input field and the additional input fields are associated with a payment to satisfy a cost of a transaction;

determining that fields for facilitating the transaction are filled based at least in part on the selected data being input into the input field and the additional selected data being input into the additional input fields; and facilitating the transaction utilizing the primary processing application.

* * * * *